(12) United States Patent
Fuisz

(10) Patent No.: US 10,334,872 B2
(45) Date of Patent: **\*Jul. 2, 2019**

(54) SMOKELESS TOBACCO PRODUCT, SMOKELESS TOBACCO PRODUCT IN THE FORM OF A SHEET, EXTRUDABLE TOBACCO COMPOSITION, METHOD FOR MANUFACTURING A SMOKELESS TOBACCO PRODUCT, METHOD FOR DELIVERING SUPER BIOAVAILABLE NICOTINE CONTAINED IN TOBACCO TO A USER, AND PACKAGED SMOKELESS TOBACCO PRODUCT SHEET

(71) Applicant: Philip Morris Products S.A.

(72) Inventor: Richard C. Fuisz, Beverly Hills, CA (US)

(73) Assignee: PHILIP MORRIS PRODUCTS S.A., Neuchatel (CH)

( * ) Notice: Subject to any disclaimer, the term of this patent is extended or adjusted under 35 U.S.C. 154(b) by 934 days.

This patent is subject to a terminal disclaimer.

(21) Appl. No.: 14/829,815

(22) Filed: Aug. 19, 2015

(65) Prior Publication Data

US 2015/0351448 A1 Dec. 10, 2015

Related U.S. Application Data

(62) Division of application No. 12/122,201, filed on May 16, 2008, now Pat. No. 9,125,434.

(60) Provisional application No. 60/979,169, filed on Oct. 11, 2007, provisional application No. 60/990,381, filed on Nov. 27, 2007.

(51) Int. Cl.
| | | |
|---|---|---|
| *A24B 13/00* | (2006.01) |
| *A24B 15/18* | (2006.01) |
| *A24B 3/18* | (2006.01) |
| *A24B 15/16* | (2006.01) |
| *A23L 27/00* | (2016.01) |

(52) U.S. Cl.
CPC .............. *A24B 13/00* (2013.01); *A23L 27/79* (2016.08); *A24B 3/18* (2013.01); *A24B 15/16* (2013.01); *A24B 15/18* (2013.01)

(58) Field of Classification Search
CPC ....... A23L 1/2205; A24B 15/16; A24B 13/00; A24B 3/18
USPC ................................................. 131/347, 352
See application file for complete search history.

(56) References Cited

U.S. PATENT DOCUMENTS

| | | |
|---|---|---|
| 1,492,600 A | 5/1924 | Laskey |
| 2,433,877 A | 1/1948 | Wells |
| 3,258,014 A | 6/1966 | Moshy |
| 3,411,515 A | 11/1968 | Hind |
| 3,693,629 A | 9/1972 | Broughton |
| 3,845,217 A | 10/1974 | Ferno |
| 3,968,804 A | 7/1976 | Kelly et al. |
| 4,136,162 A | 1/1979 | Fuchs |
| 4,144,894 A | 3/1979 | Schmidt |
| 4,581,232 A | 4/1986 | Peters |
| 4,606,357 A | 8/1986 | Dusek |
| 4,624,269 A | 11/1986 | Story et al. |
| 4,650,063 A | 3/1987 | Peters |
| 4,713,243 A | 12/1987 | Schiraldi et al. |
| 4,849,246 A | 7/1989 | Schmidt |
| 4,855,326 A | 8/1989 | Fuisz |
| RE33,093 E | 10/1989 | Schiraldi |
| 5,097,851 A | 3/1992 | Ehling |
| 5,625,737 A | 4/1997 | Saito |
| 5,948,430 A | 9/1999 | Zerbe |
| 6,072,100 A | 6/2000 | Mooney et al. |
| 6,375,963 B1 | 4/2002 | Repka |
| 6,586,449 B1 | 7/2003 | Walling |
| 6,596,298 B2 | 7/2003 | Leung |
| 6,668,839 B2 | 12/2003 | Williams |
| 6,834,654 B2 | 12/2004 | Williams |
| 6,845,777 B2 | 1/2005 | Pera |
| 6,923,981 B2 | 8/2005 | Leung |
| 7,067,116 B1 | 6/2006 | Bess et al. |
| 7,357,891 B2 | 4/2008 | Yang et al. |
| 7,452,292 B2 | 9/2008 | Yang et al. |
| 2001/0006677 A1 | 7/2001 | McGinly et al. |

(Continued)

FOREIGN PATENT DOCUMENTS

| | | |
|---|---|---|
| CN | 1354656 A | 6/2002 |
| CN | 1822819 A | 8/2006 |

(Continued)

OTHER PUBLICATIONS

International Search Report of Application No. PCT/US08/110374 dated Feb. 3, 2009.

(Continued)

*Primary Examiner* — Michael H. Wilson
*Assistant Examiner* — Dionne W. Mayes
(74) *Attorney, Agent, or Firm* — Fitch, Even, Tabin & Flannery, LLP

(57) ABSTRACT

A nonaqueous, extrudable composition includes at least one thermoplastic polymer in an amount of more than 20 wt % of the whole composition and tobacco. A smokeless tobacco product in the form of a sheet can be made by extruding or hot melt shaping a nonaqueous composition comprising at least one thermoplastic polymer and tobacco, the sheet being soluble in a user's mouth and resulting in sustained release of nicotine to the user. The sheet can be in a form that may be placed in the buccal cavity of, on the palate of or sublingually in the user, and have an average dissolution time of 5 to 50 minutes for delivering super bioavailable nicotine to the user.

10 Claims, 8 Drawing Sheets

(56) References Cited

U.S. PATENT DOCUMENTS

| | | |
|---|---|---|
| 2002/0168398 A1 | 11/2002 | Delmotte |
| 2003/0107149 A1 | 6/2003 | Yang et al. |
| 2005/0037055 A1 | 2/2005 | Yang et al. |
| 2005/0061339 A1 | 3/2005 | Hansson et al. |
| 2005/0171083 A1 | 8/2005 | Magnusson et al. |
| 2005/0208108 A1 | 9/2005 | Jannusch |
| 2005/0244521 A1 | 11/2005 | Strickland et al. |
| 2006/0191548 A1 | 8/2006 | Strickland |
| 2006/0198873 A1 | 9/2006 | Chan et al. |
| 2006/0207721 A1 | 9/2006 | Slominski |
| 2006/0257463 A1 | 11/2006 | Elsohly |
| 2007/0122455 A1 | 5/2007 | Myers et al. |
| 2007/0202057 A1 | 8/2007 | Fankhauser |
| 2007/0207186 A1 | 9/2007 | Scanion |
| 2008/0029117 A1 | 2/2008 | Mua et al. |
| 2008/0075825 A1 | 3/2008 | Fuisz et al. |
| 2008/0149121 A1 | 6/2008 | Wrenn et al. |
| 2011/0220135 A1 | 9/2011 | Wrenn et al. |

FOREIGN PATENT DOCUMENTS

| | | |
|---|---|---|
| EP | 0 250 187 A2 | 12/1987 |
| GB | 2201080 A | 8/1988 |
| JP | 2005-511522 | 4/2005 |
| JP | 2007-515950 | 6/2007 |
| WO | WO 00/42992 | 7/2000 |
| WO | 02/085119 A1 | 10/2002 |
| WO | WO 03/020882 | 4/2003 |
| WO | WO 03/039518 A1 | 5/2003 |
| WO | 2005/009386 A2 | 2/2005 |
| WO | WO 2005/046363 | 5/2005 |
| WO | 2007/095600 A2 | 8/2007 |
| WO | WO 2007/138484 | 12/2007 |

OTHER PUBLICATIONS

International Search Report of Application No. PCT/US08/11634 dated Feb. 25, 2009.
Japanese office action of Appln. No. 2010-528866 dated Mar. 27, 2013 with translation.
Chinese office action of Appln. No. 200880118170.2 dated Mar. 29, 2013 with English translation.
International Pre. Report on Patentability and Written Opinion PCT/US2008/011374 dated Mar. 22, 2010.
Chinese office action of Appln. No. 200880118176 dated Jul. 25, 2011 in English.
The Merck Index: An Encyclopedia of Chemicals, Drugs, and Biologicals: $13^{th}$ Edition, Merck & Co., Inc., Whitehouse Station, NJ, 2001.
Watson, History: Watson Inc., www.watson-inc.com Apr. 23, 2010.
Lunell et al., Steady-State Nicotine Plasma Levels Following Use of Four Different Types of Swedish Snus Compared with 2-mg Nicorette Chewing Gum: A Cross-over Study; Nicotine & Tobacco Research, vol. 7, No. 3, Jun. 2005, pp. 397-403.
Swedish Match: Nicotine Uptake: Nicotine Uptake from Snus www.swedishmatch.com Apr. 27, 2010.
Ethical Guidelines for Biomedical Research on Human Participants; Indian Council of Medical Research, New Dehli, Oct. 2006.
FDA, Draft Guidance—Guidance for Clinical Investigators, Sponsors, and IRBs, Adverse Event Reporting—Improving Human Subject Protection, www.fda.gov/cder/guidance/index.htm, Apr. 2007.
Repka et al., Influence of Vitamin E TPGS on the Properties of Hydrophilic Films Produced by Hot-melt Extrusion, International Journal of Pharmaceutics 202, p. 63-70, 2000.
Foulds et al., Is Low-Nicotine Marlboro Snus really Snus, Harm Reduction Journal, 5:9' Feb. 27, 2008.
Pharmaceutical Extrusion Technology, edited by Ghebre-Sellassie et al., p. 410, 2007.
International Pre. Report on Patentability and Written Opinion PCT/US2008/011634 dated Apr. 22, 2010.
International Pre. Report on Patentability and Written Opinion PCT/US2008/011374 dated Apr. 22, 2010.
Search Report of EP Appln. No. 08837437.6 dated Nov. 23, 2017 in English.
Conaghey, O. M; Corish, J,; Corrigan, O.I. The release of nicotine from a hydrogel containing ion exchange resins // International Journal of Pharmaceutics, vol. 170, 1998, pp. 215-224.
Anand V, Kandarapu R, Garg S. Ion-exchange resins: Carrying drug delivery forward // Drug Discovery Today, vol. 6, Issue 17, Sep. 1, 2001, pp. 905-914).
Office Action of Ukrainian Appln. No. dated Feb. 22, 2017 with English translation.
Provisional Conclusion of Substantive Examination of Ukrainian application No. a 2012 15150 dated Aug. 14, 2018 with English translation.
Office Action of Brazilian Patent Application No. PI0818163-2 dated Nov. 29, 2018 with English translation.

SMOKELESS TOBACCO PRODUCT, SMOKELESS TOBACCO PRODUCT IN THE FORM OF A SHEET, EXTRUDABLE TOBACCO COMPOSITION, METHOD FOR MANUFACTURING A SMOKELESS TOBACCO PRODUCT, METHOD FOR DELIVERING SUPER BIOAVAILABLE NICOTINE CONTAINED IN TOBACCO TO A USER, AND PACKAGED SMOKELESS TOBACCO PRODUCT SHEET

CROSS-REFERENCE TO RELATED APPLICATIONS

This application is a divisional application of application Ser. No. 12/122,201 filed May 16, 2008, which is a non provisional application and claims benefit of the filing dates of U.S. Provisional Application Nos. 60/979,169, filed Oct. 11, 2007 and 60/990,381, filed Nov. 27, 2007, the contents of each of which are incorporated herein by reference in their entireties.

BACKGROUND OF THE INVENTION

The present invention relates, inter alia, to a smokeless tobacco product an extrudable tobacco composition, a method for manufacturing a smokeless tobacco product and a method for delivering nicotine contained in tobacco to a user.

American consumption of smokeless tobacco is growing while cigarette smoking is declining. Awareness of the potential health risks of smoking, the potential risks of second hand smoke to third parties, and the increasing existence of cigarette smoking bans are all factors that are helping to shift tobacco consumption from cigarettes to smokeless tobacco. U.S. sales of moist snuff increased 10% in 2006 after several years of 6% growth while cigarette consumption decline. Another potentially contributing factor to this shift is the increasingly held view in the public health community that smokeless tobacco may be much less harmful to the health of the user than is cigarette smoking.

Smokers want alternatives to cigarette smoking. UST Inc., a holding company for U.S. Smokeless Tobacco Company, estimates that over half of US smokers are seeking smoking alternatives. Despite this fact, US smokers are generally reluctant to try smokeless tobacco products. Traditional smokeless tobacco products frequently appear to be moist and dirty. Moreover, American consumers generally react poorly to traditional smokeless tobacco products when they do try such products. It can be assumed that reactions may even be less favorable in countries which do not, like the U.S., have an incidence of modern smokeless use.

Snus style smokeless tobacco is a steam cured tobacco popularized in Norway and Sweden that is either loose or contained in a pouch and is placed in the cheek. Dipping tobacco, also known as American moist snuff or dip is also known. Now long cut tobacco has been put in single portion pouches in the past. Single portion pouches are considered convenient and are gaining increasing sales among smokeless tobacco users. Fine ground snuff tobacco has been known for centuries. Snuff is fine-ground tobacco intended for use by being sniffed or snorted into the nose or placed in the cheek. Regardless of whether tobacco is lose or in pouches, it is generally brown, often moist and is considered unsightly and unappealing by many smokers who are reluctant to use smokeless tobacco products. In addition, a certain social opprobrium is associated with tobacco-induced spitting and/or the removal of tobacco from the mouth after use.

As noted in a report by Swedish Match North Europe AB on its website at http://www.gothiatek.com/templates/start.aspx?page_id=73 entitled "Nicotine uptake from snus," (the content, including the citations therein, of which is incorporated herein in its entirety), nicotine contained in Swedish snus, has well-documented pharmacological effects on the central nervous system. Both the dose and the uptake rate are of importance for understanding the biological effects of nicotine in humans. The amount of nicotine that is absorbed during snus use (nicotine dose) can be quantified by measuring the concentration of nicotine or its metabolites in different body fluids, i.e. blood, saliva and urine. The uptake rate can be estimated by monitoring the increase of the blood nicotine concentration over time. The nicotine uptake from Swedish snus has been described in six scientific publications of different objectives and design. As noted in that report, the nicotine uptake from one pinch of snus is determined both by the amount of nicotine that is released from the pinch during snus use and by the amount of nicotine that passes the buccal mucosa and reaches the systemic circulation; almost half of the nicotine present in the pinch was extracted during snus use (37% from portion-packed snus and 49% from loose snus). By comparison of the total amount of excreted nicotine with the total amount of nicotine in the pinch per time unit, it has been concluded that only 10-20% of the nicotine originally present in the snus pinch is absorbed via the buccal mucosa and reaches the systemic circulation. During snus use nicotine is absorbed via the oral mucosa.

Because smokeless tobacco users look to nicotine uptake as significant component to tobacco satisfaction, and it is desirable to improve the nicotine absorption from a given amount of tobacco, allowing the user to reduce the amount of tobacco used for a given level of nicotine absorption. However, no methods of enhanced nicotine absorption from amount of tobacco have been taught.

A pouch due to its thickness is exposed to a significant degree of saliva flow. This flow carries a percentage of nicotine which is significant down the throat and into the stomach, with the saliva. This nicotine is subject to first pass physiology as well. In addition the pouch wall also serves as an obstruction to nicotine outflow from the tobacco. Unpouched tobacco plugs and pinches are subject to the same dynamic.

The manufacture of reconstituted tobacco sheets is a known practice in the tobacco industry. A rich patent history documents the evolution of this art (see e.g. F. H. Wells et al U.S. Pat. No. 2,433,877, issued Jan. 6, 1948) (manufacture of a wet cast sheet to recapture tobacco scraps using cellulose as a binder)). The aim of such art has been to use small tobacco particles—waste product because the particles are too small to be used in cigarettes, cigars and the like—and to make a tobacco-like sheet which can be used as filler in a cigarette or as a cigar wrapper. The reconstituted tobacco sheet is intended to behave as tobacco itself, namely as an insoluble sheet to be smoked or used as a cigar wrapper.

A number of materials have been used as binders to help bind the tobacco particles together. These include HPC, HPMC, other celluloses, Pullulan, pectin, various gums etc. Perhaps most interestingly, the use of naturally occurring plant pectins as a binder is taught (see e.g. Hind et al U.S. Pat. No. 3,411,515, issued Nov. 19, 1968).

This use of naturally occurring pectins to re-form the tobacco leave in a reconstituted sheet explains the incredibly high concentrations of tobacco used relative to small amounts of binder to form such sheets. For example, Ehling et al U.S. Pat. No. 5,097,851, issued Mar. 24, 1992, discloses a tobacco sheet with just 1-8% binder and 86 to 98% by weight tobacco material. Such ratios are unheard of in the edible film industry and are indicative of tobacco's natural proclivity to re-form itself.

The basic methods of manufacture include wet casting and aqueous based extrusion. In wet casting, the tobacco is mixed with water and the binder. It is then cast—typically onto a steel belt—and the water content is substantially reduced during a drying stage. The reconstituted tobacco sheet is then removed from the belt. (See, e.g., Schmidt et al U.S. Pat. No. 4,144,894, issued Mar. 20, 1979.)

In aqueous based extrusion, tobacco particles are mixed with a binder and water is added. The water serves to hydrate the binder and activates its adhesives properties. This mixture is then run through an extruder and typically through a slot die (see e.g. Keritsis et al. U.S. Pat. No. 4,625,737, issued Dec. 2, 1986).

Water also serves to lower viscosity. High viscosity is a limitation of aqueous casting. Water is needed to deal with the high viscosities in cast film and in extruded sheets. Adding water to lower viscosity was an interim step as new inventive steps were required as are shown in this application.

Tobacco is a mature, efficient industry and this is reflected in the evolution of reconstituted tobacco sheet art over the past sixty years. The art has tended to move from wet casting towards extrusion—for reasons of output and cost. Removing moisture from a wet cast film requires substantial amounts of heat energy. The compositional art has become simpler and more tobacco like—more tobacco, less binder. The result is that such art provides little guidance for the development of the present invention. In its ultimate embodiment, reconstituted tobacco is a type of idealized tobacco (like nature's but with better mechanical properties, etc). Thus, reconstituted tobacco art would be useful if one where seeking to make a chewing tobacco like, insoluble product. But applicant has found that it is not helpful in connection with a sustained release dissolving tobacco sheet.

Edible films are typically made using a wet casting process. In discussing the existing art, applicant pointedly uses the term "film" and not sheet. This is because the inherent properties of the wet casting manufacturing process—as currently understood—do not allow for the manufacture of thicker sheets. Related to thickness, but directly corresponding is dissolution time. Also, wet cast edible films are typically quickly dissolving products, and practitioners have struggled—and not with great success—to extend the disintegration time of wet cast edible film products where a slower dissolving product would be more appropriate for the intended use.

The development of wet cast edible packaging films for various food and other applications commenced at least fifty years ago (see http://wvvw.watson-inc.com/about_history-.php). Other historical antecedents can be seen the wet cast manufacture of fruit pulps as well as rice based films in Asia.

Wet cast monolayer film compositions for pharmaceutical and vitamin delivery are disclosed in Fuchs et al. U.S. Pat. No. 4,136,162 issued Jan. 23, 1979. Schmidt discloses bilayer film compositions for pharmaceutical and food uses in U.S. Pat. No. 4,849,246 issued Jul. 18, 1989.

The inventor Horst Zerbe was issued U.S. Pat. No. 5,948,430 for film compositions for therapeutic agents and breath freshening agents. As Zerbe notes, the thickness of films should not exceed 2.7 mils so as to prevent adverse mouth feel. The assignee of this patent, Lohmann Therapeutic Systems ("LTS"), is credited with the manufacture of the first edible film to enjoy commercial success—namely, the 2001 commercial launch of pullulan based Listerine PocketPaks® Breath Strips (a product described more fully in Leung et al. 6596298 "Fast dissolving orally consumable films" and Leung et al. 6923981).

The Listerine PocketPaks® film is a very rapidly dissolving film. It dissolves in fewer than ten seconds and has a mass of just 33 mg. The product contains high moisture content and uses water to help impart the product with flexibility (a trait easily demonstrated by drying a Listerine strip—at which point it becomes very brittle and will crack and break when bent).

From breath freshening, wet cast film technology has moved to over-the-counter pharmaceutical products. The emphasis has still been on achieving rapid disintegration in the mouth. Noted thin film drug delivery company MonoSol Rx LLC describes its film technology on its website thusly: "MonoSol Rx has developed a thin film drug delivery technology that is more stable, durable and quicker dissolving than other conventional dosage forms. The thin film, which is similar in size, shape and thickness to a postage stamp, has the ability to carry very low doses of prescription products that are highly uniform, to larger doses up to 80 mg. The technology enables buckle and sublingual delivery [italics added]."

Other pharmaceutical thin film developers, such as LTS and Applied Pharma Research describe their film technologies in similar ways.

The transition of thin film drug delivery into pharmaceutical products required a new focus on meeting pharmaceutical criteria, like achieving and maintaining content uniformity of drug during the wet cast manufacturing process (see e.g. Yang et al. US 2003/0107149 A1). Wet cast compositional film art developed that could load increasing amounts of drug with continuing emphasis on quick disintegration of the film. (See Yang et al. US 2005/0037055 A1.)

One limitation of wet cast technology is the difficulty—indeed, the inability to wet cast films beyond a certain thickness range. This is due to the relationship between viscosity and coating thickness, which creates a practical limitation on the ability to coat beyond certain thickness levels, and the difficulty removing moisture from films past a certain thickness levels, even if they are successfully cast.

Limitations on thickness translate into limits on the amount of active ingredient a film can carry. The largest amount of solid active delivered by a commercially available film is 25 mg of diphenhydramine in Pfizer's Benadryl® strip. Likewise, limitations on thickness also limit the dissolution time of the film matrix. The challenge of extending dissolution times in monolayer wet cast media is evident in Fankhauser et al US 2007/0202057 A1, a case directed at cast films containing nicotine. This case uses bench scale formulation tricks including an ice water bath (to gel the polymer) to coax a monolayer wet cast film to a claimed fifteen minute disintegration time. That such a practice would involve immense challenges—arguably impossible—to scale to commercial manufacture is readily apparent.

Others have suggested the lamination of multiple films to slow the dissolution of the dosage form (see, e.g. LTS's website). This method is undoubtedly more practical from a manufacturing perspective than Fankhauser's proposed solution, but too costly to practice—even in the pharmaceutical space. As a result, such multiple film laminates are not seen in the marketplace as commercial products.

Even monolayer wet casting can be relatively expensive. Commercial equipment involves long drying ovens and is too heavy to be moved, requiring specialized production suites. Drying requires substantial volumes of filtered air, and substantial amounts of heat energy to remove moisture. These costs may be easily born by pharmaceutical products but can be challenging in the cost competitive global tobacco field.

Two additional points must be made—namely, the physical strength and physical stability of wet cast films. Wet cast films are typically cast on a substrate or backing paper. Among other things, the substrate lends physical strength to the film in processing until the film is delaminated from the substrate. If such films lack the requisite pliability and tensile strength, they will tend to break during packaging causing substantial losses in process yield. Such breakage issues presumably led to the filing of a patent on methods of film splicing (Slominski et al 20060207721). MonoSol Rx makes the most pliable, strong wet cast films, using their polyethelene oxide (PEO) based compositions (See Yang et al. US 2005/0037055 A1). The strength of these films as led to the subsequent use of PEO in formulations commercially sold by Novartis. The reality is that physical strength and resulting breakage and process yield issues have been significant problems for many of the non-PEO films.

The related issue of physical stability is also an issue for many wet cast films—expensive barrier packaging is often used as a matter of necessity. Still, physical stability is not always a given. Boots Chemists launched a Vitamin C strip manufactured by BioProgress in Tampa Fla. that had to be removed from the shelves because it was crumbling in the package—earning the name "chips not strips." This story is not unique—many projects have failed to move out from development to commercialization due to physical stability issues.

In addition to issues with wet casting, the mixing of wet based compositions for casting itself raises certain challenges. First, the solvent itself adds volume to the mix. Wet compositions may tend to adhere to mixing vessels and any transit piping leading to yield losses. Foaming may be in issue. Wet mixtures must be de-gassed to avoid air bubbles which can reduce content uniformity. See, Fuisz et al. US 20080075825 A1.

Extruded edible products have a lengthy history—confections were being extruded in the 1920's (See P. B. Laskey U.S. Pat. No. 1,492,600). Extrusion has more recently been used in medical device manufacture and in the making of transdermal drug delivery systems—of course, these are both non-edible and insoluble. See, generally, *Pharmaceutical Extrusion Technology*, edited by Issac Ghebre-Sellassie and Charles Martin (2007), the content of which is incorporated herein in its entirety.

Inspired by the success of transdermal drug delivery systems, work began to extrude soluble, edible sheets and films for drug delivery use.

Schiraldi et al. (U.S. RE33,093) discloses bioadhesive monolayer extruded films, under 10 mils, composed of principally of polyethylene oxide together with a lesser amount of HPC, a water insoluble polymer, a plasticizer and a medicament. See also Mooney and Schiraldi, U.S. Pat. No. 6,072,100 disclosing compositions extruded fast dissolving films comprising a composition of PEO or HPC, a water polymer derived from a carboxylic aid, 30-80% plasticizer and up to 10% of a medicament.

Michael Repka and James McGinnity disclose hot melt extruded sheets with a thickness of 10-13 mils using a 50-50 ratio PEO and HPC, together with 3% of Vitamin E TPGS (see "Influence of Vitamin E TPGS on the properties of hydrophilic films produced by hot melt extrusion," International Journal of Pharmaceutics 202 (2000) 63-70.

Repka et al U.S. Pat. No. 6,375,963 issued Apr. 23, 2002 disclose an extruded film composition that includes HPC, PEO, polycarbophil [an acrylic polymer] and the absence of a plasticizer.

A review of the Orange Book indicates that none of the above extrusion patents are used in an FDA approved pharmaceutical product nor are any such patents referenced on any over-the-counter product.

As the art demonstrates, practitioners have struggled to achieve required flexibility in hot melt extruded pharmaceutical films, and have relied on PEO, polycarbophil or extreme levels of plasticizer to achieve such flexibility of the sheet or film. Neither PEO nor polycarbophil is approved for food use outside of the US. Additionally, PEO is a very expensive polymer that is ill suited to tobacco products from a cost perspective. As a result, the pharmaceutical art on extruded films and sheets provides little guidance for the composition of the present invention.

Traditional tobacco products are removed from the mouth after use. These include chewing tobaccos, plugs, SNUS products and the like. Smokers are often reluctant to use these products because they are believed to be socially inappropriate since removal from the mouth can be embarrassing or can offend others.

Various dissolving tobacco products have been taught.

Williams U.S. Pat. No. 6,669,839, issued Dec. 30, 2003, discloses a low nitrosamine tobacco tablet comprising at least 50% tobacco.

Williams U.S. Pat. No. 6,834,654, issued Dec. 28, 2004, discloses a low nitrosamine tobacco composition formed from pulverized tobacco and consisting essentially of Virginia flue cured tobacco.

Pera U.S. Pat. No. 6,845,777, issued Jan. 25, 2005, discloses a product comprised of tobacco, an antioxidant, caffeine and S-Adenosyl-Methionine in a tablet or capsule that is allowed to disintegrate in the mouth or buccal cavity.

Strickland et al WO 2005/04363 discloses wet cast, fast dissolving HPMC based films containing tobacco (see Example B (wet cast HPMC based film of 2.5 mil thickness that disintegrates in less than one minute), Example D (two layer HPMC wt cast film—one layer with tobacco—that dissolves in less than one minute), Example E (three layer HPMC wet cast film that will disintegrate in less than one minute), Example F (an aerated wet cast HPMC film for even faster dissolution), Example K (an HPMC/starch wet cast film than disintegrates in less than one minute), Example L (an HPMC/starch wet cast film that disintegrated in 15-30 seconds) and Example M (an HPMC/starch wet cat film that disintegrated in 15-30 seconds). In Example R, a water based HPC based solution containing tobacco is fed through a twin-screw extruder at a rate of 1-3 pounds an hour, yielding a film of "thickness varying from 2-3 mils." This film was apparently tacky—as one would expect from this composition and Mylar was placed "between the film layers to prevent adhesion." Moisture levels of the finished product were not disclosed. Unlike the cast examples, it is noted this "tobacco film was placed in a container suitable for storage" presumably due to tackiness and other stability issues caused by exposure to ambient conditions. This film "disintegrated . . . over a period of 2-4 minutes."

Wren WO 2007/138484 discloses fast dissolving film strips containing over 50% tobacco that dissolve in less than a minute and "preferably faster." Wren mentions pullulan, cellulose ethers, sodium alginate, pectin, gums and mixtures thereof as "binders". Wren discloses a wet casting manufacturing process.

Mua et al US 2008/0029117 A1 disclose examples of wet cast films containing tobacco, and aqueous mixtures that are extruded as films or sheets through a pasta maker. The examples are primarily alginate based but may also include HPMC, HPC and starches.

The quick dissolving tobacco strips that are disclosed in the above art are basic film compositions that disintegrate rapidly in the mouth. It is highly doubtful that such fast dissolving products could deliver acceptable tobacco satisfaction, including sufficient nicotine absorption. Instead, the matrix will fully dissolve before acceptable nicotine is absorbed from the tobacco, and the tobacco from the dissolved matrix will be swallowed. Undoubtedly, this is part of the reason why none of these products have been sold commercially.

While there is constructive mention of "extrusion" and some extruded water based films, hot melt extrusion of sheets and/or films containing tobacco is not taught either in method or composition. As is seen the pharmaceutical art concerning hot melt extrusion of sheets and/or films containing active ingredients involves real challenges which must be overcome, as they are by the present invention.

Thus, it is still desirable to provide a more efficient way to absorb nicotine from tobacco.

BRIEF SUMMARY OF THE INVENTION

The present invention relates to a nonaqueous, extrudable composition comprising at least one thermoplastic polymer in an amount of more than 20 wt % of the whole composition and tobacco.

The present invention also relates to a smokeless tobacco product comprising a sheet made by extruding or hot melt shaping a nonaqueous composition comprising at least one thermoplastic polymer and tobacco, the sheet comprising a matrix comprising the at least one thermoplastic polymer and the tobacco distributed in the matrix, the matrix being soluble in a user's mouth and resulting in sustained release of nicotine to the user.

The present invention also relates to a smokeless tobacco product comprising a nonaqueous composition comprising at least one thermoplastic polymer and tobacco in a form that may be placed in a buccal cavity, sublingually or on a palate of a user and having an average dissolution time of 5 to 50 minutes, measured for a composition in the form of a sheet having a surface area of approximately 1-1.5 in$^2$ and a thickness of approximately 10-40 mil, to dissolve fully in a buccal cavity of a user.

The present invention also relates to a smokeless tobacco product comprising a matrix and tobacco in an amount of less than 100 mg and having a maximum measured nicotine plasma concentration greater than 4 ng/ml when administered in a single dose.

The present invention also relates to a smokeless tobacco product comprising a matrix and tobacco in an amount of less than 100 mg and having an area under a nicotine plasma concentration versus time curve from zero to infinity greater than 23 ng/ml when administered in a single dose.

The present invention also relates to a method for making a tobacco product, comprising extruding a nonaqueous composition comprising at least one thermoplastic polymer in an amount of more than 20 wt % the whole composition and tobacco through an extruder to form an extruded sheet of the nonaqueous composition.

The present invention also relates to a method for delivering super bioavailable nicotine from a tobacco product to a user, comprising providing a sheet comprising an extruded nonaqueous composition comprising at least one thermoplastic polymer and tobacco; and placing the sheet in the buccal cavity of, on the palate of or sublingually in the user.

The present invention also relates to a co-packaged product comprising a first package containing at least one extruded tobacco product comprising a sheet made of a nonaqueous composition comprising at least one thermoplastic polymer and tobacco and a second package containing at least one cigarette, the first and second packages being co-packaged together in an outer package.

DETAILED DESCRIPTION OF THE INVENTION

Figure 1:
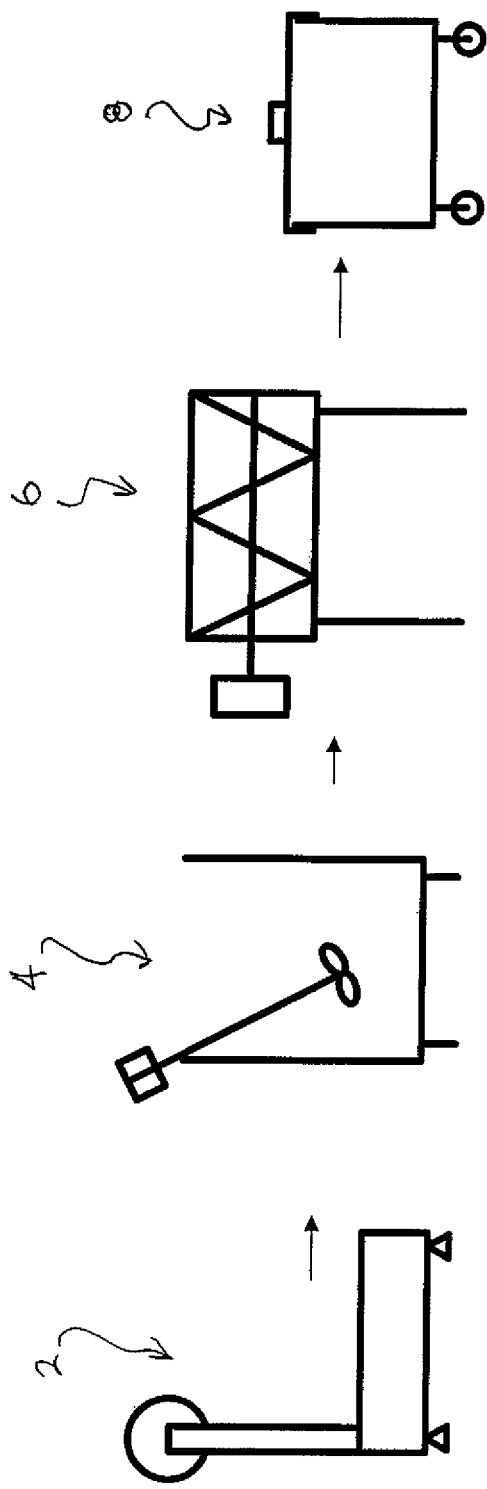
FIG. 1 is a schematic diagram showing one example of a mixing process that can be used in the manufacturing method for the tobacco product of the present invention.

The present invention is shown to deliver greater nicotine blood levels using smaller amounts of tobacco than existing smokeless tobacco products. This allows for lower amounts of tobacco to be used while stile delivering desired nicotine levels, and counterintuitively means that less tobacco is swallowed by the user of the present invention as compared with conventional tobacco products which are removed from the mouth after use—despite the product of the present invention being fully dissolvable.

In one aspect of the present invention, the invention relates to a nonaqueous, extrudable composition comprising at least one thermoplastic polymer and tobacco.

By the term "nonaqueous," applicants mean that the composition includes a number of materials but that no water or other aqueous solvent has been added in addition to any water, moisture or aqueous solvent that may be present in the other materials in the composition. For example, the composition may contain tobacco that may have a small amount of residual moisture content and/or a flavoring that may itself be aqueous, but the composition does not contain any water in addition to the residual moisture content in the tobacco and/or any water in the flavoring; therefore, such a composition would still be considered "nonaqueous" as that term is defined herein. Preferably, the nonaqueous composition of the present invention contains less than 10 wt % water prior to extrusion, preferably less than 4 wt % water after extrusion or hot melting.

As the thermoplastic polymer, polymer and matrix formers that are thermo-processable are preferred. The thermoplastic polymer may comprise at least one polymer selected from the group consisting of cellulose ethers, polyethylene oxide, polymethacrylates, poloxamers, extrudable carbohydrates, polyethylene glycols, PVP, poly vinyl alcohol, acrylates, ethyl cellulose, cellulose acetate butyrate, poly(ethylene-co-vinyl acetate), poly vinyl acetate, poly(methylvinyl ether/maleic anhydride) co-polymer, pullulan and hydroxypropyl methylcellulose (HPMC). Preferably, the thermoplastic polymer is water soluble.

In one embodiment of the invention, a cellulose ether such as hydroxypropyl cellulose (HPC) is preferred. Examples of commercially available HPC that can be used include KLUCEL® EF, ELF and LF hydroxypropylcellulose (HPC) sold by Hercules Incorporated, Aqualon Division, of Wilmington, Del. (referred to hereinafter, respectively, as HPCEF, HPCELF and HPCLF).

If PEO is used, it is preferred that the molecular weight of the PEO is 100,000 or greater and less than 1,000,000. The PEO can also be used in combination with other polymers. If PEO is used, it is preferred that Vitamin E and Vitamin E derivatives be used as a stress crack eliminator. We found that 1 to 15% of Vitamin E or Vitamin E derivative functions to eliminate such stress cracking with 5 to 10% preferred and 5% most preferred.

Certain insoluble polymers may be used in conjunction with soluble polymers to extend the dissolution time.

The tobacco can have a thickness of 0.1 micron or more, up to actual tobacco shreds. It is preferable to use low nitrosamine tobacco. Tobacco blends may be used. It is preferable that the tobacco particle or shred be small enough so as not to render the extruded product sheet too bumpy. That is the particles are small enough not to disrupt the surface. Thus, the tobacco is preferably snuff tobacco preferably having a size distribution between 0.1 and 600 microns (inclusive). Brutons and Packard's Club snuff are examples of the type of tobacco and particle size that can be used. The tobacco can comprise a tobacco extract in whole or in part.

The nonaqueous, extrudable composition comprises at least one such thermoplastic polymer in an amount of more than 20 wt % of the whole composition. Preferably, the composition comprises at least one such thermoplastic polymer in an amount of at least 30 wt %, more preferably at least 40 wt %, of the whole composition, e.g., at least 50 wt % of the whole composition.

The nonaqueous, extrudable composition can also include a mucosal absorbing enhancer, i.e., a substance that enhances absorption through buccal and gingival mucosa and epithelium (otherwise known (see U.S. Patent Application Publication No. 2006/0257463) as a "penetration enhancer" or "permeability enhancer"). The mucosal absorbing enhancer may include but is not limited to diethylene glycol monoethyl ether (Transcutol), 23-lauryl ether, aprotinin, azone, benzalkomin chloride, cetylperidium chloride, cetylmethylammonium bromide, dextran sulfate, lauric acid, lauric acid/propylene glycol, lysophosphatilcholine, menthol, methoxysalicylate, oleic acid, phosphaidylcholine, polyoxyethylene, polysorbate 80, sodium EDTA, sodium glycholated, sodium glycodeoxycholate, sodium lauryl sulfate, sodium salicylate, sodium taurocholate, sodium taurodeoxycholate, sulfoxides, and various alkyl glycosides or, as described in U.S. Patent Application Publication No. 2006/0257463, bile salts, such as sodium deoxycholate, sodium glycodeoxycholate, sodium taurocholate and sodium glycocholate, surfactants such as sodium lauryl sulfate, polysorbate 80, laureth-9, benzalkonium chloride, cetylpyridinium chloride and polyoxyethylene monoalkyl ethers such as the BRIJ® and MYRJ® series, benzoic acids, such as sodium salicylate and methoxy salicylate, fatty acids, such as lauric acid, oleic acid, undecanoic acid and methyl oleate, fatty alcohols, such as octanol and nonanol, laurocapram, the polyols, propylene glycol and glycerin, cyclodextrins, the sulfoxides, such as dimethyl sulfoxide and dodecyl methyl sulfoxide, the terpenes, such as menthol, thymol and limonene, urea, chitosan and other natural and synthetic polymers. Preferably, the mucosal absorbing enhancer is a polyol, e.g., polyethylene glycol, glycerin, maltitol, sorbitol etc. or diethylene glycol monoethyl ether (Transcutol).

To improve the absorption of nicotine by the user, it is preferred that the nonaqueous, extrudable composition has a pH of 4 to 8, preferably 6 to 8. Buffering agents may be used to control pH, including without limitation, sodium bicarbonate, potassium bicarbonate, sodium carbonate, potassium carbonate, dipotassium phosphate and potassium citrate, It is preferred that the nonaqueous, extrudable composition has a tobacco specific nitrosamine (TSNA) content less than 50 ppm. This can be achieved in the manner set forth hereinafter. The total amount of TSNAs is the product of concentration and mass. Since the product of the present invention can use a reduced amount of tobacco due to nicotine super bioavailability relative traditional smokeless tobacco products, it can be seen that the product of the present invention has a greatly reduced total TSNA content relative to traditional smokeless tobacco products.

The nonaqueous, extrudable composition can also, optionally, include a sweetener, such as sucralose, and/or a flavoring, e.g., peppermint, cherry, bourbon, rum, smokey rose, sweet brown & spicy, wintergreen, cool mint, bergamot, citramint, and licorice. Suitable flavoring additives are commercially available from Tobacco Technology, Inc. of Eldersburg, Md. Most flavorings preferably use ethyl alcohol as solvent, or are solvent-free.

The nonaqueous, extrudable composition can also include a plasticizer. The plasticizer may be present in an amount up to 30% based on the weight of the thermoplastic polymer. The plasticizer can be, without limitation, at least one of polyethylene oxide, polypropylene glycol, polyethylene glycol, glycerin, edible polyols, glycerol, polyols, maltitol, isomalt, and reduced sugars. In the case of using HPC as the thermoplastic polymer, the plasticizer can be polyethylene oxide.

A coloring agent can optionally be added. The use of titanium dioxide up to 5 percent by weight results in a white or lightly colored product. A coloring agent such as titanium dioxide can be used combination with a lightly colored tobacco, such as Bruton or F & T snuff as it is lighter in color resulting in a lighter colored product. Other edible pigments may be used, such as Colorcon Red #40.

The nonaqueous composition described above can be formed into a smokeless tobacco product comprising a sheet by extruding or hot melt shaping, as described more fully hereinafter, the sheet comprising a matrix comprising the at least one thermoplastic polymer and the tobacco distributed in the matrix, the matrix being soluble in a user's mouth and resulting in sustained release of nicotine to the user.

The smokeless tobacco product can be in the form of a sheet that has a shape conducive, either in a folded or unfolded state, to placement in a user's buccal cavity, on a user's palate or sublingually, e.g., a rectangular thin strip shape. The rectangular shape may have a length of 1/16 inch to 4 inches long, a width of 1/16 inch to 4 inches and a thickness of 5 to 50 mils. The smokeless tobacco product sheet may alternatively have an oblong shape approximately 0.25 inch wide and 1.25 inches long. It can alternatively be ovoid or any shape conducive to use.

The smokeless tobacco product preferably includes, after manufacture, less than 4 wt % water.

The smokeless tobacco product sheet preferably has an average (average of a number of users) dissolution time of 5 to 50 minutes, measured for a sheet having a surface area of approximately 1-1.5 $in^2$ and a thickness of approximately 10-40 mil, to dissolve fully in a buccal cavity of a user.

The smokeless tobacco product sheet preferably has a tensile strength of at least 2 lbs, preferably 4 lbs (measured according to the tension/tear test described in Example N) for efficient packaging operation.

The smokeless tobacco product sheet preferably has a uniformity in the range of ±10%, more preferably ±5%. That is, the thickness of the sheet and tobacco content preferably varies over its entire surface area, as compared to an average thickness of the sheet, by at most ±10%, more preferably ±5%. The sheet can be packaged in a number of different ways, some of which will be apparent to those skilled in the art.

One way to package the individual sheets would be in a stack in a correspondingly sized slim container, similarly to the cassette packaging of Listerine PocketPaks® Breath Strips. Such a package may be co-packaged with a second package containing at least one cigarette, e.g., a typical cigarette pack, the two packages being co-packaged together in an outer package, the outer package preferably being transparent. For example, this type cassette can be comfortably inserted between the outer packaging and the plastic overwrap of a package of cigarettes, e.g., Marlboro® cigarettes. Such co-packaging may be effected by the consumer combining the two products, or by the packager of the cigarettes. Such co-packaging is not limited to cassettes. In another example, tobacco sheets may be placed in small foil bag and similarly inserted between the cigarette package and plastic overwrap.

Alternatively, the sheet may be formed into a continuous rolled sheet, and provided in a package similar to a known package for dispensing stamps from a roll of stamps, i.e., the package having an opening for removing a desired length of the rolled sheet and a cutting edge for cutting the desired length of the rolled sheet from a remaining portion of the rolled sheet provided in the package. Variable width sheets can be sold, analogous to a regular and king size cigarette. For example, a package containing a roll of thinner width can be sold as a "light" product.

In another alternative embodiment, the sheet, e.g., a large extruded or hot melt shaped sheet, instead of being cut to form the aforementioned sized and shaped sheets, may be shred to form a shredded tobacco product and the shredded tobacco product provided in a package.

In yet another embodiment, the product can be packaged in a typical smokeless tobacco container—round or rectangular—and facilitates packaging using existing thin film stack and pack technology such as rotary cutters and guillotine style cutters.

Ink jet printing with edible inks may be used to print labels, brand names or other images on the product.

The tobacco product can be manufactured by hot melt shaping or, in particular, by hot melt extruding the nonaqueous composition described above. Now the most efficient way known to applicant to make this product is to use hot melt extrusion technology so that the product is economically feasible and has fine rheological properties. The product may be extruded in state of the art single or multiple screw extruders, preferably with appropriate cooling jackets, tubes and pumps.

Alternatively, the product can be melted between, e.g., foil, layers on a lower hot plate, and pressed to shape and desired thickness with an upper hot surface. The foil can be cooled with a cooling liquid to cool the product, and the product peeled from the foil layers. Other hot melt systems like heated guns may also be used to melt the composition.

However, a preferred method for making the tobacco product is to extrude the nonaqueous composition described above through an extruder to form an extruded sheet of the nonaqueous composition. Preferably, extruding of the composition is carried out without injecting gas into the composition. The extruded sheet preferably has a thickness of 5 to 50 mils. Preferably the composition is extruded at a temperature sufficiently low and for a time sufficiently short to not substantially increase a tobacco specific nitrosamine content thereof. For example, the composition can be extruded at a temperature of 400° F. or lower and a time of 3 minutes or less, more preferably 350° F. or lower, and for a time of 2 minutes or less, most preferably at a temperature of less than 200° F. Certain compositions extrude as low as 180 F. If a flavoring is contained in the composition and the flavoring is in liquid form, preferably the extruder is vented.

The extruded sheet is then cut to form a plurality of smaller sheets, the smaller sheets having the appropriate size and shape, e.g., the sizes and shapes described above. Such cutting into pieces may be done using a plethora of existing cutting methods, including F&G rotary blade stack and pack machines, guillotine style cutters, die cut machines, etc.

Any portions of the extruded sheet discarded after cutting may be recycled to an inlet of the extruder. For example, the product can be subject to certain product loss in packaging. For example, the edges of the roll stock may be trimmed or cut off to ensure that all products have uniform appearance. Additionally, waste may be created in the packaging step. To re-use such loss product, the loss product may be chipped and added to the composition placed in the extruder.

This method for re-use allows for the use of the non-rectangular shapes. Such shapes can be die cut from the sheet but are typically disfavored in the wet cast thin film industry because of the resulting product loss (theoretically equal to the area of the rectangle minus the area of the die cut dose and in practice larger).

Instead of immediately cutting the extruded sheet, extruded sheet may be wound about a roll to form a roll of the extruded sheet. The extruded product is non-tacky and can be rolled without a backing and without the layers of the roll sticking to one another. The roll can be slit using a conventional slitter perpendicularly to an axis of the roll in a number of places to form a plurality of rolls or bobbins having a width of, e.g., 1 inch. These slit bobbins can them be cut into pieces.

Identifiers, including without limit, brand names and designs may be printed on each piece using conventional edible ink jet technology as is currently used in the thin film drug delivery industry.

For thicker sheets it may be desirable to add chewing gum chickle to the exterior of the sheet. This provides an initial pleasant taste and makes placement in the mouth easier.

Thicker sheets, e.g., sheets greater than 25 mils, may be chewed by the user even without the addition of chickle.

Immediately after extrusion, the sheet may be passed around a portion of at least one roller. The at least one roller may be smooth or may be textured to provide a textured surface one side or both sides of the extruded sheet. The textured surface on one or both sides can aid in mucoadhesion. For example, the at least one roller may be graveured to provide a design on a surface on at least one side of the extruded sheet.

In yet another alternative, the sheet may be passed, after extrusion, through dual heated rollers to assure an absolute uniform thickness. Better heat transfer is obtained if both rollers are heated but it is not absolutely necessary. If the heat makes the sheet tacky, a backing substrate which is siliconized or made non-stick can be provided, which can go through on one or both sides of the sheet so as to prevent sticking to the roller(s) and then get wound up right away on a take-up spool, or the rollers can be made to have a non-stick (e.g., Teflon) surface. The backing substrate just keeps sticky polymers from sticking to the rollers. Also to improve speed of process one may include chilling rolls which will lower the temperature of the film post heating/flattening stage. Certain thermoplastic polymers require more plasticizer so that, for example, pullulan may require 20-30% of a glycerin to plasticize and yet not be sticky while other polymers like HPC LF cannot take as much as 3 or 4% glycerin without being over-plasticized. It is just a matter of the Tg of the native polymer. HPC LF has a much lower Tg than pullulan and, therefore, does not need as much interruption of the intermolecular bonding, which plasticizers tend to do. The LF polymer is sticky because the Tg of the plasticized polymer is lower than room temperature. If the Tg was, e.g., 45° C. then it would not be tacky to the touch at room temperature. However, if the temperature is raised to 45° C., the same polymer would be tacky. That is why to have low extrusion temperature polymers one should look for low Tg polymers (like HPC) or polymers that are crystalline and melt at low temperature (like PEO).

In some cases, it may be desirable for the sheet to be thicker on one end (across its width) then the other, i.e., basically a wedge shaped sheet. In extrusion, this is easily accomplished by the die being wider on one side than the other.

The extruder may be a single screw extruder. In one embodiment of the invention, the nonaqueous composition is extruded through the single screw extruder. Alternatively, the extruder may be a double screw extruder with a pump to pump the nonaqueous composition through a die thereof at constant pressure. The extruder may comprise a gear pump and coat hanger-type die to control the pressure in the extruder and the thickness of the sheet across a width of the sheet.

The extruder dye can be provided with a small tit or tits that cause a mark or line by indentation. The mark or line can serve to indicate a fold mark on the sheet for user for reasons as will be apparent hereinafter.

Preferably, the sheet has a tensile strength of at least 2 lbs, preferably 4 lbs (measured according to the tension/tear test described in Example N) for efficient packaging operation. Efficiency in packaging means packaging speed/output and yields. A good tensile strength means that the sheet or film stock will not break under the tensions placed on such stock during the packaging process. Breakage from such tensions reduces output through down time and also reduces yield as the packaging machine must be re-threaded.

Preferably, the composition is exposed to heat in processing for less than 90 seconds to reduce formation of tobacco specific nitrosamines.

During extrusion, it is possible to provide supercritical liquid injection, e.g., $CO_2$ liquid, to the extruder to make a quick dissolve extruded foam.

Figure 2:
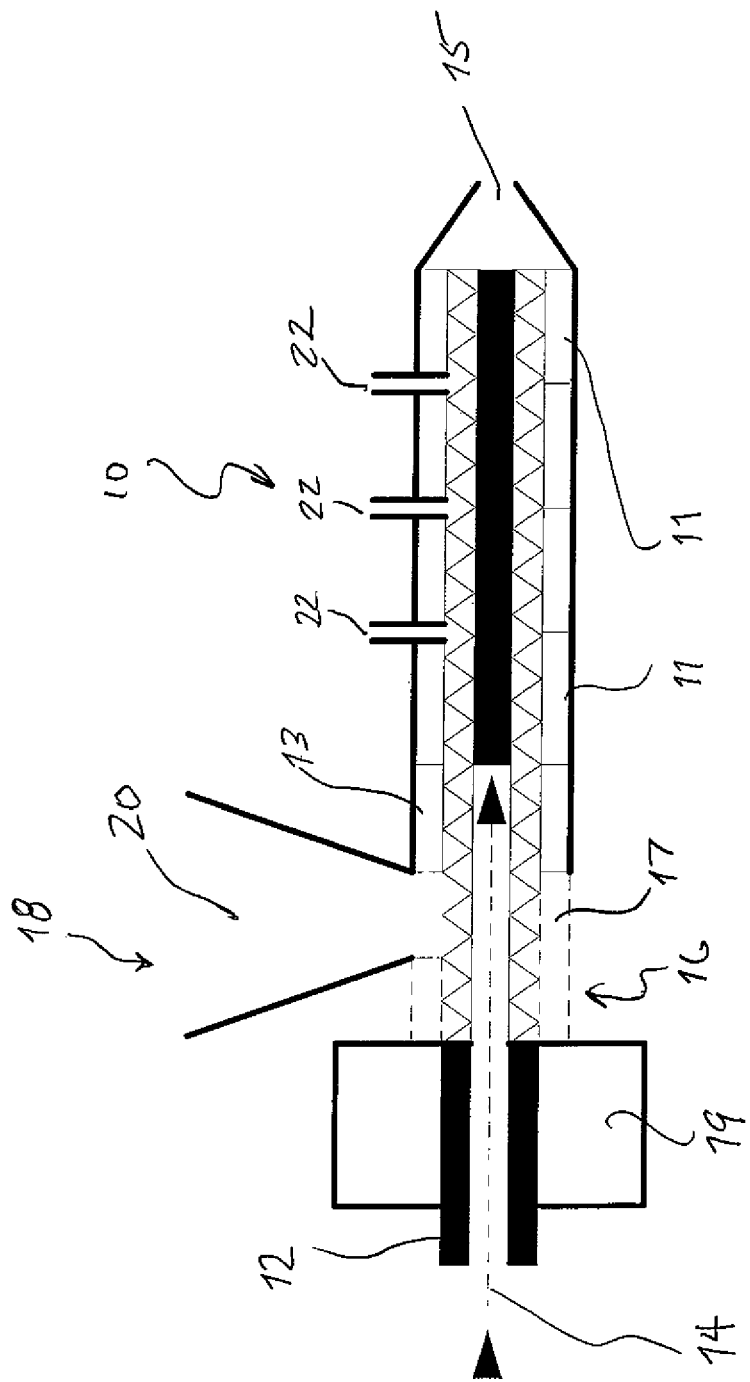
FIG. 2 is a schematic diagram showing one example of an extrusion process that can be used in the manufacturing method for the tobacco product of the present invention.

According to one aspect of the present invention, the tobacco product can be manufactured by the method of the nom-limitative example shown schematically in FIGS. 1 and 2.

As shown in FIG. 1, all solid materials are weighed with scale 2. and premixed in mixer & chopped recycle. The flavors and plasticizers are also weighed and can be mixed in blend mixer 4. The blend in blend mixer 4 can be added to a mixer with choppers 6, to which chopped recycle can also be added, where mixing is finished. The mix can then be stored in finish mix container 8.

As distinguished from aqueous compositions, the non-aqueous compositions of the present invention are easier to mix. Non-aqueous compositions imply lower mixing volumes and the absence of degassing issues. Conventional mixers may be used. Feeding of the mix into the extruder must be performed at a controlled rate (e.g., using a ktronic mixer) to ensure constant pressure in the extruder and at the slot die.

FIG. 2 is a schematic diagram showing one example of an extrusion process/extruder 10 that can be used in the manufacturing method for the tobacco product of the present invention. A typical single screw extruder with heating zones 11, cooling zones 13, die 15 and drive 19 is modified according to this embodiment to better process the composition of the present invention. Cooling of the front section of extruder screw shaft 12 can be accomplished by a water-cooling bore 14. Cooling of the barrel 16 and the area around the feeding section 18, fed by feeding hopper 20, by additional barrel and feeding section cooling zones 17 keeps the product from melting and plugging the hopper 20. The screw design is well balanced to keep the screw 12 full with no cavitation to keep pressure constant. Venting ports 22 are provided to remove vapors/gases to keep the sheet free of bubbles and smooth.

Figure 3:
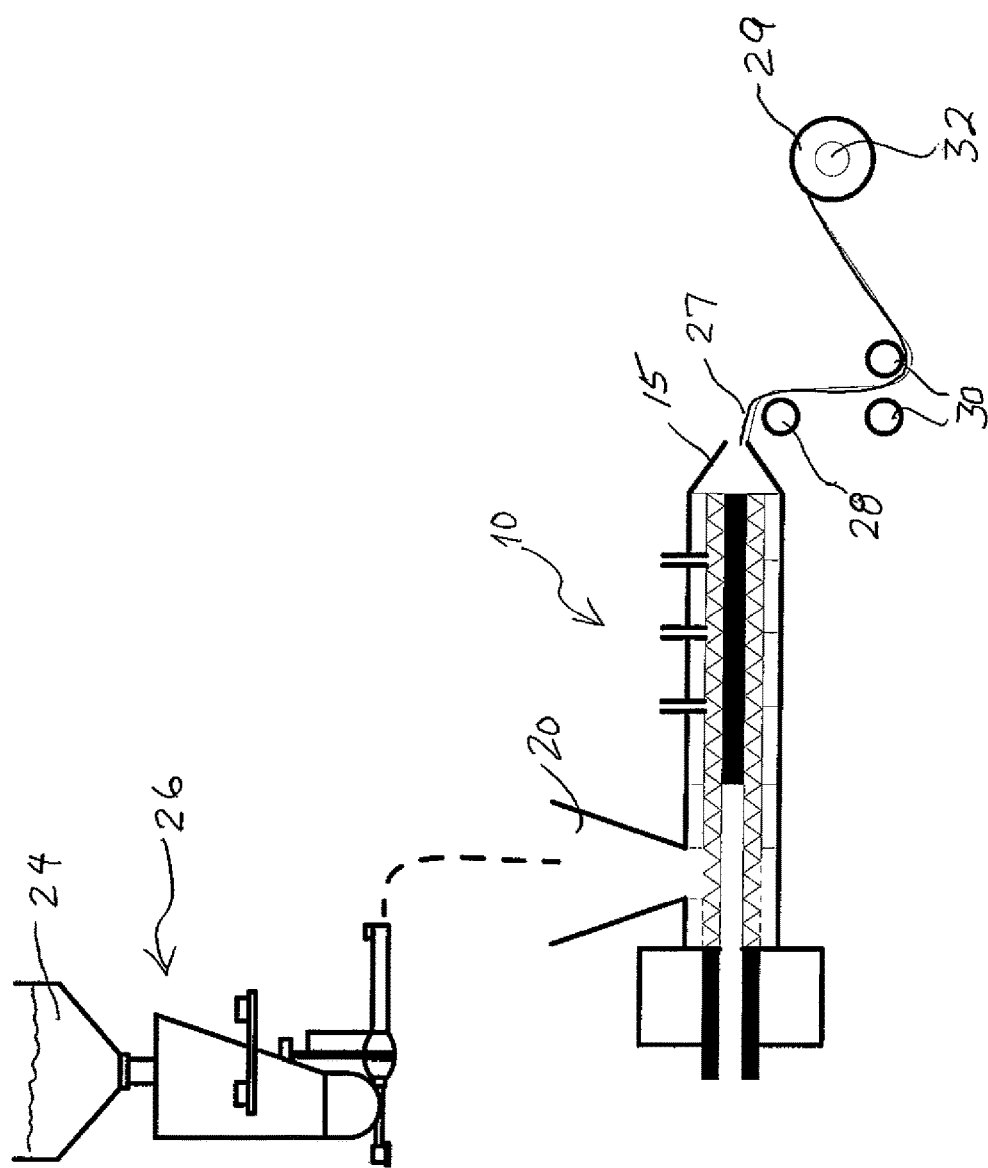
FIG. 3 is a schematic diagram showing one example of a small scale extrusion process that can be used in the manufacturing method for the tobacco product of the present invention.

FIG. 3 is a schematic diagram showing one example of a small scale extrusion process that can be used in the manufacturing method for the tobacco product of the present invention. In FIG. 3, the complete mix 24, including solids and liquids, is fed from a loss in weight feeder 26 to the hopper 20 of the extruder 10. The extruded sheet 27 coming from die 15 is passed around a chill roll 28 and over portions of rollers 30. It is then wound by a torque winder 32 onto a roll 29.

Figure 4:
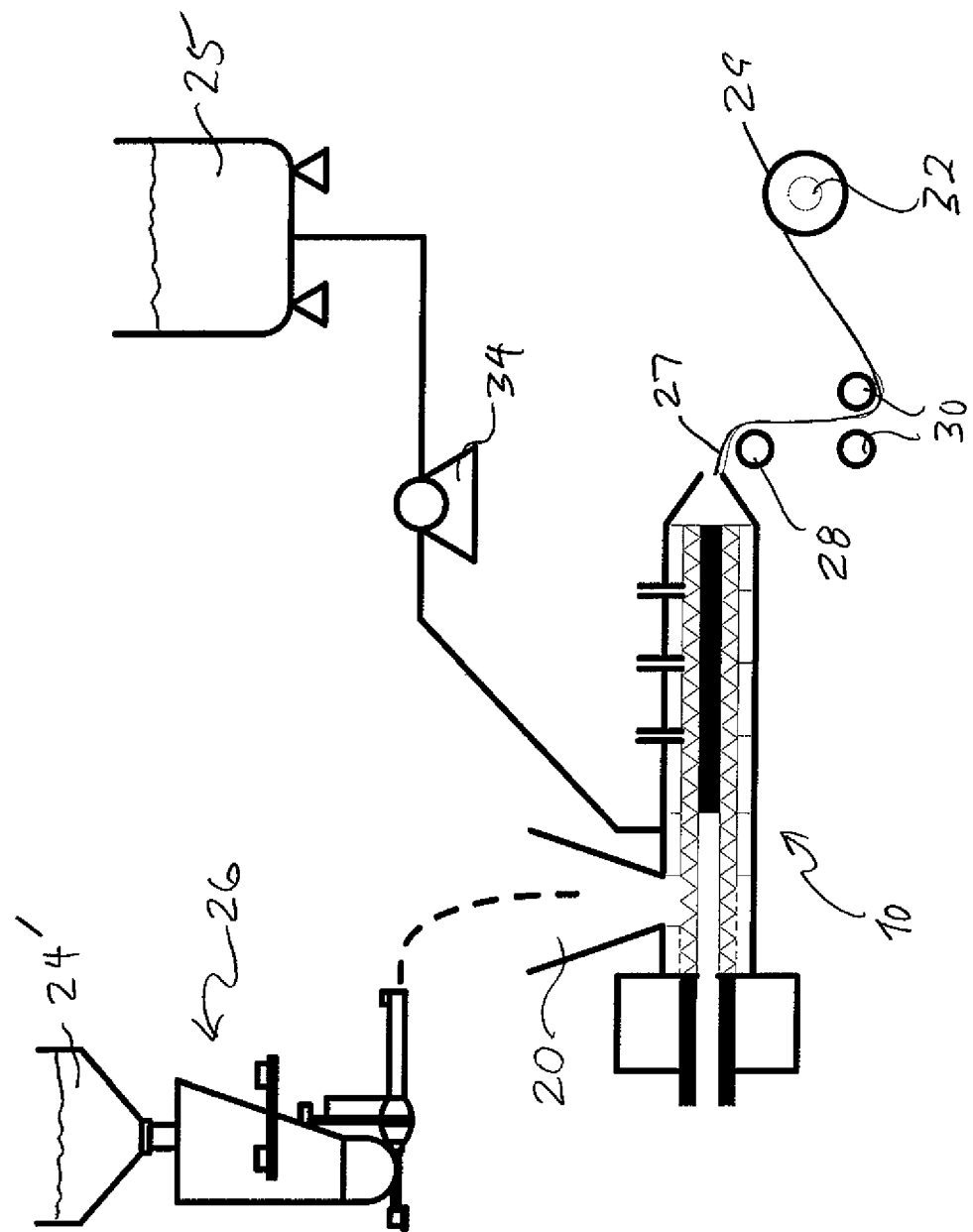
FIG. 4 is a schematic diagram showing one example of a medium scale extrusion process that can be used in the manufacturing method for the tobacco product of the present invention.

FIG. 4 is a schematic diagram showing one example of a medium scale extrusion process that can be used in the manufacturing method for the tobacco product of the present invention. FIG. 4 shows a process similar to that of FIG. 3 but allows for separate feeding of a solids blend 24' and a flavors/plasticizers blend 25 in liquid form by proportioning pump 34. This embodiment has the advantages that it reduces cross contamination and reduces clean up time.

Figure 5:
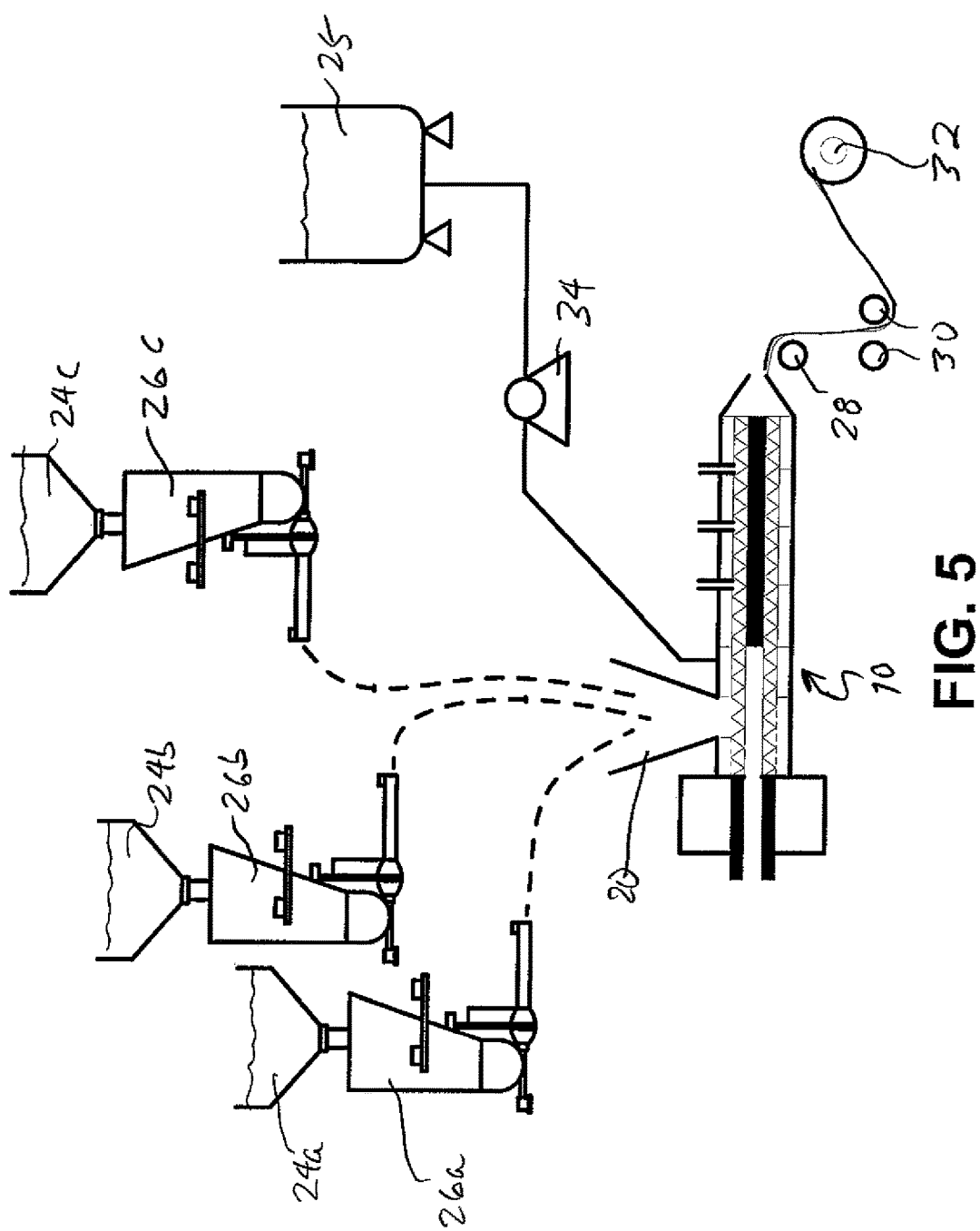
FIG. 5 is a schematic diagram showing one example of a large scale extrusion process that can be used in the manufacturing method for the tobacco product of the present invention.

FIG. 5 is a schematic diagram showing one example of a large scale extrusion process that can be used in the manufacturing method for the tobacco product of the present invention. FIG. 5 shows a process similar to that of FIG. 4 but allows for separate feeding of polymer 24a, small percentage solids blend 24b and tobacco 24c using loss in weight feeders 26a, 26b and 26c, respectively. This embodiment has the advantages that it reduces cross contamination, reduces clean up time, reduces the number of batches and reduces mixer size.

Figure 6:
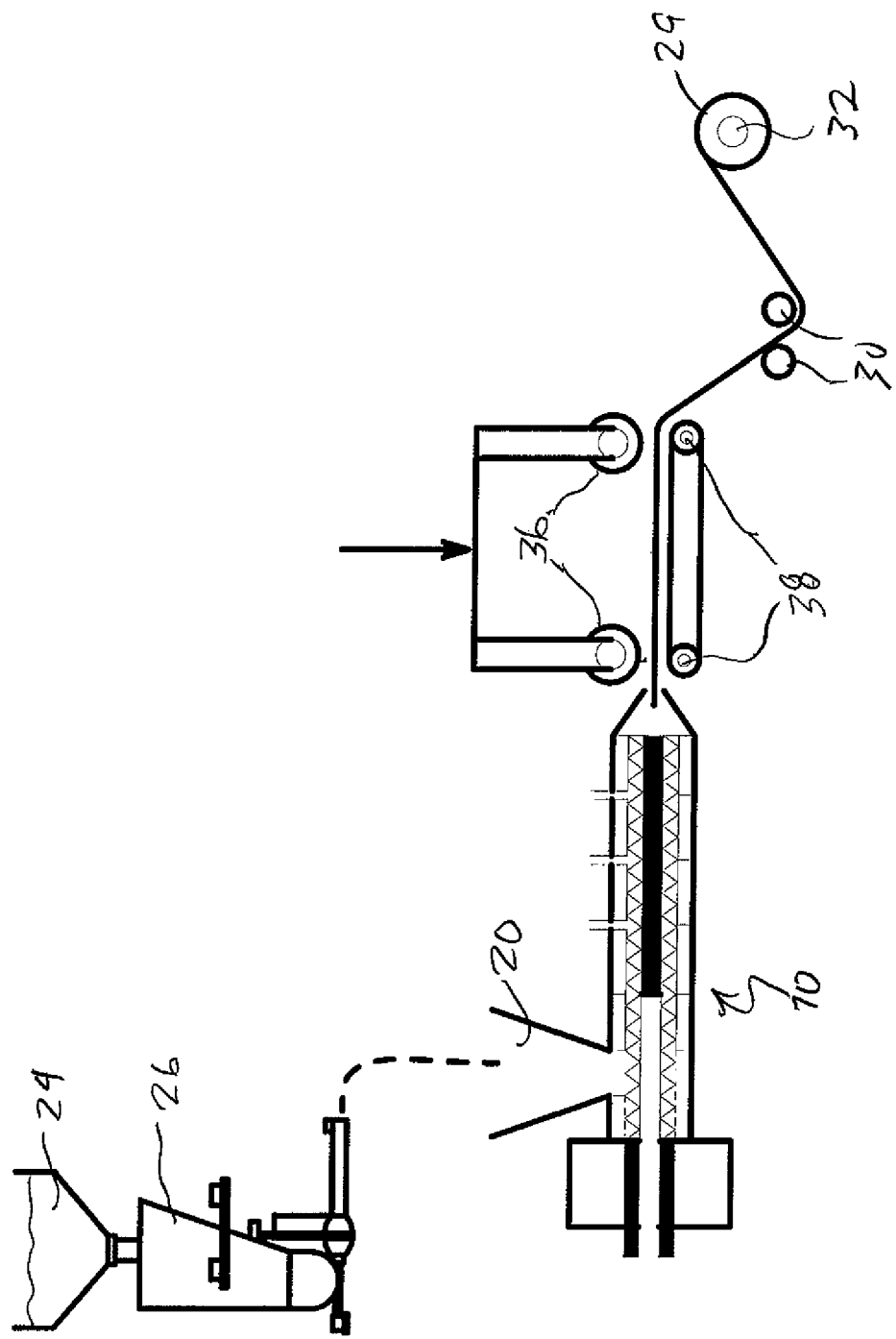
FIG. 6 is a schematic diagram showing one example of an extrusion process with optional compression rollers that can be used in the manufacturing method for the tobacco product of the present invention.

FIG. 6 is a schematic diagram showing one example of an extrusion process with optional compression rollers 36 and heated rollers 38 that can be used in the manufacturing method for the tobacco product of the present invention to even out thickness across the web substrate.

Another aspect of the invention is a method for delivering nicotine from a tobacco product to a user by providing a sheet comprising an extruded nonaqueous composition comprising at least one thermoplastic polymer and tobacco, and placing the sheet in the buccal cavity of, on the palate of or sublingually in the user. The present invention enables the nicotine to be delivered to the user in a super bioavailable form. The sheet can be folded at approximately a mid-point of its length to form a V-shaped folded sheet before placing the sheet in, e.g., the buccal cavity.

In using the tobacco sheet of the present invention, adhering the tobacco sheet to the buccal cavity and increasing the disintegration or dissolution time can be achieved by the user folding the sheet to form what is referred to herein as the "V architecture". The tobacco sheet can be sold or cut to dimensions of x by y inches. This cut tobacco sheet can then be folded by the consumer or manufacturer at approximately the midpoint of the film, making for a film of 0.5 x by y. The term "V Architecture" refers to the resulting shape. The tobacco sheet is now thicker and displays spring-like characteristic to push outwards. The film is then placed in the buccal cavity and the spring like characteristic makes the tobacco sheet adhere more easily in the buccal cavity no matter how placed.

It is believed that the key drivers for a successful smokeless tobacco product are: (a) taste, (b) pharmacokinetics, (c) appearance, (d) packaging, (e) discretion of use, (f) cost of goods (g) mucoadhesiveness, (h) stability of the composition, (i) reducing amount of tobacco swallowed, (j) Reducing TSNAs.

Taste. Product taste is critical for any consumer product. The ability to incorporate concentrated, vibrant flavors is critical where the target consumer i.e. smokers, tend to lack experience with smokeless tobacco products. The organaleptics of our product are excellent.

Pharmacokinetics. An important component of tobacco enjoyment is the effective enjoyment of nicotine naturally found in tobacco. The product should provide a rapid onset, and sustained delivery of, the nicotine naturally found in tobacco. By providing a product that can be used directly contacting the mucosa allows the product to efficiently transfer its nicotine to the oral mucosa. In the matrix tobacco of the present invention, the material has no pouch and is thinner than 50 mils and can be tucked between the cheek and gingiva epithelial cells in a manner such that it has a large surface area in contact with the buccal mucosa (or placed sublingually) and is minimally available to saliva flow and maximizes epithelial absorption. This results in avoidance of first pass and a far better percentage of tobacco nicotine absorption. This is evidenced by the pk level being a higher percentage compared to the total tobacco weight in the matrix as compared to pouch products. In addition, by placing absorbency mucosal enhancers in the matrix this can be further enhanced. By using pure tobacco or snuff, the relative amount of tobacco itself in the product is much higher than in other smokeless forms since tobacco in other smokeless forms is not pure but contains moisture, flavorings, inert material etc. In addition, and very importantly, the surface area of the tiny particulate snuff is huge compared to the surface area of the whole tobacco product used in competing smokeless tobacco products. The net result is a far higher ratio of absorption of nicotine through the mucosa.

Appearance. It is not intuitive for smokers to put tobacco in their mouth. The product should have a neat and clean appearance that is smooth and may be colored in pleasing colors.

Packaging. Packaging must be convenient and portable.

Discretion. Smoking is a social act with an important image component. In contrast, smokeless tobacco consumption should be a discrete act. Ideally, a smokeless product is spitless and fully dissolves (i.e. does not require ultimate removal from the mouth), like the tobacco sheet product of the present invention. For years cigarette smoking has caused an environmental nuisance by the litter of "butts". Pouches of tobacco raise the specter of used pouches taking there place. The present pouchless, fully dissolvable product therefore lacks these problems and can be a clean neighbor environmentally. Thus, the product of the present invention can reduce environmental pollution, and provides the user with a product that can be used without embarrassment or fear of offending others in a social setting.

Cost of Goods. The tobacco industry is a high margin industry. Products that are expensive to manufacture or distribute are inevitably niche products in the global marketplace. To be successful, a product must be manufactured on a competitive basis with existing tobacco products and not require refrigeration during distribution (like e.g. Camel SNUS®). With the rapid increase in energy costs, the need for refrigeration is not fiscally or environmentally desirable.

Mucoadhesiveness. The level of mucoadhesiveness of the composition should fall within a range for ease of use. When a composition is too mucoadhesive, it can adhere to the buccal tissue too early, i.e. before the user has had the opportunity to place the product in the desired location. Moreover, if the product is too mucoadhesive, the user may experience discomfort when making normal mouth and lip movements—essentially, an overly mucoadhesive product will act as a two sided tape uncomfortably binding the gum and lip together.

The corollary is that a level of mucoadhesion that is too low will result in a product that moves—feels to float—in the buccal cavity. Such floating is uncomfortable and not pleasing for the user. Moreover, the floating of the product in the buccal cavity will tend to reduce nicotine absorption by increasing reducing the time of effective buccal exposure and contact, and increasing the relative amount of saliva flow (which may dissolve the product too quickly and lead to the swallowing of tobacco prior to the desired absorption of nicotine).

Stability of the Composition. Physical stability of the product is critical for use of the product. The product must remain in one piece and should be reasonably pliable for use by the consumer (see for example "V Architecture" below). Moreover, the product should be physically stable without the use of expensive barrier packaging like foils, or Aclar®. The sheets of the present invention can be stored at room temperature with no packaging for a period of time, e.g., 100 days, with no demonstrable increase in tackiness. The sheets of the present invention can be unrolled easily and with no loss of flexibility (i.e., the ability to bend).

Reducing Amount of Tobacco Swallowed. The use of the tobacco sheet product by a consumer achieves the advantageous result of reducing the amount of tobacco swallowed by the consumer as compared with traditional, non-dissolving smokeless tobacco products. This is a counterintuitive result —the super bioavailability of nicotine in the present invention allows for the use of relatively small amounts of tobacco in a fully dissolving product matrix as compared to the amount of tobacco in traditional products, resulting in the actual swallowing of less tobacco with the present invention than from some traditional smokeless tobacco products (which are considered to be non-dissolving).

Reducing TSNAs. Tobacco Specific Nitrosamines (TS-NAs) are considered by many to be a cause of cancer in tobacco users. Accordingly, in this view, the control and minimization of TSNA levels in the final product is desirable. This is achieved by starting with a tobacco that is low in TSNAs. A low moisture content in the final product may also mitigate growth of TSNAs. Some believe that SNUS is refrigerated in part to retard such growth.

TSNAs are thought to be created, among other ways, by exposure to heat. Thus, to ensure that minimal TSNA's are created, the residence time of tobacco in the extruder can be minimized (see below). In addition, a composition is used with a relatively low melt temperature can be used to allow for relatively lower processing temperatures.

The residence time of tobacco in the extruder can be reduced by using appropriately precise feed device of the dry blend, together with a proper screw design so that the use of a pump is avoided.

Additionally, the tobacco can be injected into the extruder after the hold melt base has already been formed.

The following are nonlimiting examples of the present invention.

EXAMPLE A

The following ingredients were mixed in a dry blend, using multiple batches in a Hamilton 8 cup Hamilton Beach/Cuisinart style food processor for a total quantity of 10 kg's.

| Ingredient | % | Supplier |
| --- | --- | --- |
| HPC LF | 58.75 | Aqualon (Hercules) |
| Propylene Glycol FCC, NF | 3 | Spectrum |
| Xylitol NF | 5.25 | Roquette |
| Bitter Masker | 2 | Ungerer |
| Sucralose | 2 | Tate & Lyle |
| Snuff | 25 | Bruton |
| Peppermint Flavor | 2 | Ungerer |
| TiO2 | 2 | DNP International |
| Total | 100 | |

The dry blend was fed into a single screw extruder (L/D ration 36) with rpm set at 180 and a barrel temperature set at 230 F for the initial zone and 300 F for subsequent zones and the slot die. The extruder was fed at a rate of 7 kg of material per hour. The liquid base of the flavor was vented from the extruder. The slot die was set at 30 mils. The slot die had a width of ten inches. The sheet was extruded with the take off rollers and showed a thickness of 13 mils and was rolled onto a roller without the use of any backing materials. Residence time of the material in the extruder was approximately ninety seconds. Thickness was measured and determined to be uniform across the web and through the roll.

The sheet was flexible and robust. Pieces were cut into dimensions of 1 in. by 1 in. The pieces could be bent 180 degrees without breaking. These pieces were folded and placed in the upper gum and showed a dissolution time of 12-25 minutes. When placed in the lower gum, where greater saliva is present, they folded samples showed a dissolution time of 8-15 minutes. The long period of dissolution resulted in a distinct minty breath for a long period. This far exceeded the lasting effect of traditional cast thin film.

EXAMPLE B

The roll stock of Example A was slit using a conventional slitter to make a bobbin of 1 inch width. The bobbin was then successfully cut using an F&G packaging machine that is typically used in the thin film industry to cut strips and drop them into the cassettes. The material cut easily and was placed ten-count into standard cassettes used for film products like breath fresheners and Chloraseptic® sore throat strips.

EXAMPLE C

The bobbin of Example B was easily cut into pieces using a guillotine style cutter.

EXAMPLE D

The following ingredients were mixed in a dry blend, using multiple batches in a Hamilton 8 cup Hamilton Beach/Cuisinart style food processor or a total quantity of 10 kgs.

| Ingredient | % | Supplier |
| --- | --- | --- |
| HPC LF | 55.75 | Aqualon (Hercules) |
| Propylene Glycol FCC, NF | 6 | Spectrum |
| Xylitol NF | 5.25 | Roquette |
| Bitter Masker | 2 | Ungerer |
| Sucralose | 2 | Tate & Lyle |
| Snuff | 25 | Bruton |
| Peppermint Flavor | 2 | Ungerer |
| TiO$_2$ | 2 | DNP International |
| Total | 100 | |

The dry blend was fed into a single screw extruder (L/D ration 36) with rpm set at 180 and a barrel temperature set at 230° F. for the initial zone and 300° F. for subsequent zones and the slot die. The extruder was fed at a rate of 7 kg of material per hour. The liquid base of the flavor was vented from the extruder. The slot die was set at 30 mils. The slot die had a width of ten inches. The sheet was extruded and with the take off rollers showed a thickness of 13 mils and was rolled onto a roller without the use of any backing materials. Residence time of the material in the extruder was approximately ninety seconds.

Thickness was measured and determined to be uniform across the web and through the roll.

The roll stock was found to be smooth, flexible and strong like Example A. The sheet was cut into pieces and used in the mouth. No significant increase in the mucoadhesiveness was observed, despite the increased amount of plasticizer in the form of PEG.

The above notwithstanding, this mix showed some propensity to plug in the hopper due to premature melting. This could be ameliorated because the hopper in the screw used picked up some heat transfer from the gearbox. Thus, the use of a cooling system like a water jacket could maintain a more constant temperature at the hopper. However, in view the excellent flexibility of example 1, it did not appear that the additional plasticizer of this example (give the failure of such plasticizer to increase mucoadhesiveness) could be said to improve the product.

EXAMPLE E

The following ingredients were mixed in a dry blend, using multiple batches in a Hamilton 8 cup Hamilton Beach/Cuisinart style food processor for a total quantity of 5 kgs for each batch.

| Ingredient | % | Supplier |
|---|---|---|
| HPC ELF | 60 | Aqualon (Hercules) |
| Propylene Glycol FCC, NF | 2 | Spectrum |
| Xylitol NF | 5 | Roquette |
| Bitter Masker | 2 | Ungerer |
| Sucralose | 2 | Tate & Lyle |
| Snuff | 25 | Bruton |
| Peppermint Flavor | 2 | Ungerer |
| TiO2 | 2 | DNP International |
| Total | 100 | |
| HPC ELF | 60 | Aqualon (Hercules) |
| Propylene Glycol FCC, NF | 1.25 | Spectrum |
| Xylitol NF | 5 | Roquette |
| Bitter Masker | 2 | Ungerer |
| Sucralose | 2 | Tate & Lyle |
| Snuff | 25 | Bruton |
| Cherry | 2 | Tobacco Technology |
| TiO2 | 2 | DNP International |
| Red 40 Pigment | .75 | Colorcon |
| Total | 100 | |
| HPC ELF | 60 | Aqualon (Hercules) |
| Propylene Glycol FCC, NF | 2 | Spectrum |
| Xylitol NF | 5 | Roquette |
| Bitter Masker | 2 | Ungerer |
| Sucralose | 2 | Tate & Lyle |
| Snuff | 25 | Bruton |
| Bourbon | 2 | Tobacco Technology |
| TiO2 | 2 | DNP International |
| Total | 100 | |

In each case, the dry blend was fed into a single screw extruder (L/D ration 36) with rpm set at 180 and a barrel temperature set at 150 F for the initial zone and 180 F for subsequent zones and the slot die. The extruder was fed at a rate of 7 kg of material per hour. The liquid base of the flavor was vented from the extruder. The slot die was set at 10 mils. The slot die had a width of ten inches. The sheet was extruded and with the take off rollers and showed a thickness of 13 mils and was rolled onto a roller without the use of any backing materials. Residence time of the material in the extruder was approximately ninety seconds. Thickness was measured and determined to be uniform through the roll although it was noted that constant feed rate was particularly important to achieve such uniformity due to the low process temperature and density change of the mix causing the pressure rose to the 750 psi range (as compared with approximately 280 psi in the case of Example A). This points to the importance of the use of a loss and weight feeder and a balanced screw design to match the bulk density. Additionally, die quality is also important as die pressures increase to ensure a uniform product. The sheet was strong and appeared to be very stable. It was exposed to ambient room conditions for twenty days without any apparent loss of flexibility or strength. The sheet of each of the flavors was cut into one inch square pieces, which were then used in the buccal cavity. The pieces were found to be somewhat mucoadhesive than the sheet of Example A. This was attributed to the characteristics of HPC ELF.

EXAMPLE F

The following ingredients were mixed in a dry blend, using multiple batches in a Hamilton 8 cup Hamilton Beach/Cuisinart style food processor for a total quantity of 5 kgs

| Ingredient | % | Supplier |
|---|---|---|
| PEO 1105 | 5.5 | Dow (Colorcon) |
| PEO N80 | 30.94 | Dow (Colorcon) |
| PEO N10 | 13.75 | Dow (Colorcon) |
| HPC LF | 4.81 | Aqualon |
| Maltitol | 12.75 | Roquette |
| Sucralose | 2 | Tate & Lyle |
| Snuff | 25 | Bruton |
| Vitamin E TPGS | 2 | Eastman Chemical |
| Peppermint Flavor | 2 | Ungerer |
| Citric Acid NF CL-131 | 1 | Spectrum |
| TiO2 | 0.25 | DNP International |
| Total | 100 | |

The dry blend was fed into a single screw extruder (L/D ration 36) with rpm set at 180 and a barrel temperature set at 230 F for the initial zone and 300 F for subsequent zones and the slot die. The extruder was fed at a rate of 7 kg of material per hour . . . . The liquid base of the flavor was vented from the extruder. The slot die was set at 30 mils. The slot die had a width of ten inches The sheet was extruded with the take off rollers and showed a thickness of 12 mils and was rolled onto a roller without the use of any backing materials. Residence time of the material in the extruder was approximately ninety seconds.

Thickness was measured and determined to be uniform across the web and through the roll.

The sheet was flexible and robust. Pieces were cut into dimensions of 1 in. by 1 in. The pieces could be bent 180 degrees without breaking. This formula demonstrated improved mucoadhesion as compared with the composition of Example A.

EXAMPLE G

The following ingredients were mixed in a dry blend, using multiple batches in a Hamilton 8 cup Hamilton Beach/Cuisinart style food processor for a total quantity of 10 kgs.

| Ingredient | % | Supplier |
|---|---|---|
| HPC LF | 53.75 | Aqualon (Hercules) |
| Propylene Glycol FCC, NF | 3 | Spectrum |
| Xylitol NF | 5.25 | Roquette |
| Bitter Masker | 2 | Ungerer |

-continued

| Ingredient | % | Supplier |
|---|---|---|
| Sucralose | 2 | Tate & Lyle |
| Snuff | 30 | Bruton |
| Peppermint Flavor | 2 | Ungerer |
| TiO2 | 2 | DNP International |
| Total | 100 | |

The dry blend was fed into a single screw extruder (L/D ration 36) with rpm set at 180 and a barrel temperature set at 230 F for the initial zone and 300 F for subsequent zones and the slot die. The extruder was fed at a rate of 7 kg of material per hour. The liquid base of the flavor was vented from the extruder. The slot die was set at 30 mils. The slot die had a width of ten inches The sheet was extruded with the take off rollers and showed a thickness of 13 mils and was rolled onto a roller without the use of any backing materials. Residence time of the material in the extruder was approximately ninety seconds. Thickness was measured and determined to be uniform across the web and through the roll.

The sheet was flexible and robust. Pieces were cut into dimensions of 1 in. by 1 in. The pieces could be bent 180 degrees without breaking. These pieces were folded and placed in the upper gum and showed a dissolution time of 12-25 minutes. When placed in the lower gum, where greater saliva is present, they folded samples showed a dissolution time of 8-15 minutes. As compared with the sheet of Example A, users of one inch square pieces of this material noted a slight increase in tobacco taste.

EXAMPLE H

A test was performed to determine how much tobacco is swallowed by a user of a traditional smokeless tobacco product. Copenhagen pouches were used. Some product weight variances was observed so two examples with close weights were selected—a pouch of 1.147 gram and a pouch of 1.101 gram. Because of the moisture content in the tobacco, the study design as to dry the first pouch as a control in an oven for one hour at 350 F. The weight of the pouch after such drying was measured and found to be 667 mg.

A second pouch—initially weighed at 1.101 grams, was used for a half hour in the cheek in a conventional manner. The pouch was then subjected to one hour of drying at 350 F. The pouch weight after drying was 345 mg.

The implication of the weight disparity after drying is that the user swallows (approximately 667-345 mgs) 322 mgs of tobacco and flavors when using the product in its intended use.

EXAMPLE I

Batches were made using the same Hamilton mixer in the quantities and compositions set forth below.

| Ingredient | % | Supplier |
|---|---|---|
| Peppermint (17 lbs) | | |
| HPC LF | 57.75 | Aqualon (Hercules) |
| Propylene Glycol FCC, NF | 2 | Spectrum |
| Xylitol NF | 5.25 | Roquette |
| Bitter Masker | 2 | Ungerer |
| Sucralose | 2 | Tate & Lyle |
| Snuff | 25 | Bruton |
| Peppermint | 2 | Ungerer |
| Glycerin | 1 | Lognis |
| Tio2 | 2 | DNP International |
| Sodium Bicarbonate | 1 | Arm and Hammer |
| Total | 100 | |
| Peppermint (7 lbs) | | |
| HPC LF | 58.75 | Aqualon (Hercules) |
| Propylene Glycol FCC, NF | 2 | Spectrum |
| Xylitol NF | 5.25 | Roquette |
| Bitter Masker | 1.5 | Ungerer |
| Sucralose | 1.5 | Tate & Lyle |
| Snuff | 25 | Bruton |
| Peppermint | 1.5 | Ungerer |
| Glycerin | 1.5 | Lognis |
| Sodium Bicarbonate | 1.5 | Arm and Hammer |
| TIO2 | 1.5 | DNP |
| Total | 100 | |
| Cherry (6 lbs) | | |
| HPC LF | 53.75 | Aqualon (Hercules) |
| Propylene Glycol FCC, NF | 4.25 | Spectrum |
| Xylitol NF | 5.25 | Roquette |
| Bitter Masker | 2 | Ungerer |
| Sucralose | 2 | Tate & Lyle |
| Snuff | 25 | Bruton |
| Cherry | 4 | Tobacco Technology |
| Red # 40 | .75 | Colorcon |
| Sodium Bicarbonate | 1 | Arm and Hammer |
| TIO2 | 2 | DNP |
| Total | 100 | |
| CHERRY (6 lbs) | | |
| HPC LF | 53 | Aqualon (Hercules) |
| Propylene Glycol FCC, NF | 3 | Spectrum |
| Xylitol NF | 5.25 | Roquette |
| Bitter Masker | 2 | Ungerer |
| Sucralose | 2 | Tate & Lyle |
| Snuff | 25 | Bruton |
| Cherry | 4 | Tobacco Technology |
| Red # 40 | .75 | Colorcon |
| Sodium Bicarbonate | 1 | Armin Hammer |
| TIO2 | 2 | DNP |
| Citric Acid | 1 | |
| Glycerin | 1 | |
| Total | 100 | |

All four of these compositions were run at the process conditions described for Example A. It was noted that glycerin served to both increase the mucoadhesiveness of the product; it also increased the tackiness of the product. It was determined that tackiness reached an undesirably high level when used above 1% of the composition.

EXAMPLE J

Four healthy volunteers used identically dosed pieces of the product of Example 1 and the next day used pieces of the Cherry flavor of the immediately preceding example. Three of the four reported, anecdotally, a greater nicotine update from the Cherry of the preceding example. This was attributed to the use of Sodium Bicarbonate and the effect of pH on nicotine absorption.

EXAMPLE K

The following ingredients were mixed in a dry blend, using multiple batches in a Hamilton 8 cup Hamilton Beach/Cuisinart style food processor for a total quantity of 11 lbs.

| Ingredient | % | Supplier |
|---|---|---|
| HPC LF | 59.25 | Aqualon (Hercules) |
| Propylene Glycol FCC, NF | 2 | Spectrum |
| Xylitol NF | 5.25 | Roquette |
| Bitter Masker | 2 | Ungerer |
| Sucralose | 2 | Tate & Lyle |
| Snuff | 25 | Bruton |
| Peppermint | 2 | Ungerer |
| TIO2 | 2 | DNP |
| Glycerin | .5 | Lognis |
| Total | 100 | |

This composition was extruded in accordance with the process set forth in example 1, and resulted in a similarly uniform product web. As expected, the reduction in glycerin reduced the tackiness of the resulting sheet.

EXAMPLE L

A test was performed to determine to determine whether the pH stability of the product. The sheet of example A was dissolved—10 g of sheet in a 20 gram bottle of water. Using an Oakton pH meter, the pH was determined to be 6.8. The same material was tested in the same fashion two months later and the result was 6.71

EXAMPLE M

A test was performed to determine the effect on pH of compositions including sodium bicarbonate. The sheet of the second cherry of Example H was performed as in the preceding example, and pH was determined to be 7.34.

EXAMPLE N

Tension/Tear Tests:

Samples from Example 1 were clipped an upper end into a heavy duty binder clip attached to a bottom hook of a Baker 0-25 lb. spring scale and clipped at a lower end in another heavy duty binder clip. The heavy duty binder clip to which the bottom of the test sample was clipped was pulled slowly with gage set to 10 lb. until failure (tear) of the sample product. A Listerine PocketPaks® Breath Strips (Cool Mint) (just purchased) failed at 0.5 pounds, a Cough, Cold and Allergy strip produced by Monosol Rx, LLC failed at 0.25 lbs., while a tobacco sheet strip according to the present invention failed at 7.5 lbs.

One of the main reasons these tension results are so important, is that a lack of tension strength, as shown in two of the sample comparative products, is very problematic in slitting and packaging. If the roll snaps, the manufacturing line comes to a stop. A proper product, such as that of the present invention, should have sufficient tear resistance to hold up under slitting and packaging.

EXAMPLE O

Bioavailability of Nicotine in Tobacco Buccal Sheet of the Present Invention vs. Bioavailability of Nicotine in Nulife Chewettes:

This example utilized sheets of Example 1 containing 75 mg of tobacco.

Nicotine absorption from smokeless tobacco is widely considered to be a critical component of tobacco satisfaction. Nicotine uptake from smokeless tobacco has been widely studied. Most public health experts believe that Swedish SNUS style smokeless tobacco provides the best nicotine absorption of the currently marketed smokeless tobacco products. "The relatively high nicotine delivery of Swedish snus is similar to a cigarette, and much higher than most existing nicotine replacement therapies including nicotine gum, lozenge, inhaler and nasal spray." (See "Is Lownicotine Marlboro snus really snus," Jonathan Foulds and Helena Furberg, Harm Reduction Journal 2008 5:9).

Leading SNUS maker Swedish Match has incorporated a study of nicotine absorption performed by Erik Lunell and Marienne Lunell as part of its Gothiatek standard. The Lunell study is entitled, "Steady state nicotine plasma levels following use of four different types of Swedish Snus compared with a 2-mg Nicorette® chewing gum: crossover study." (Nicotine & Tobacco Research Volume 7, Number 3 (June 2005) 397-403).

Figure 7:
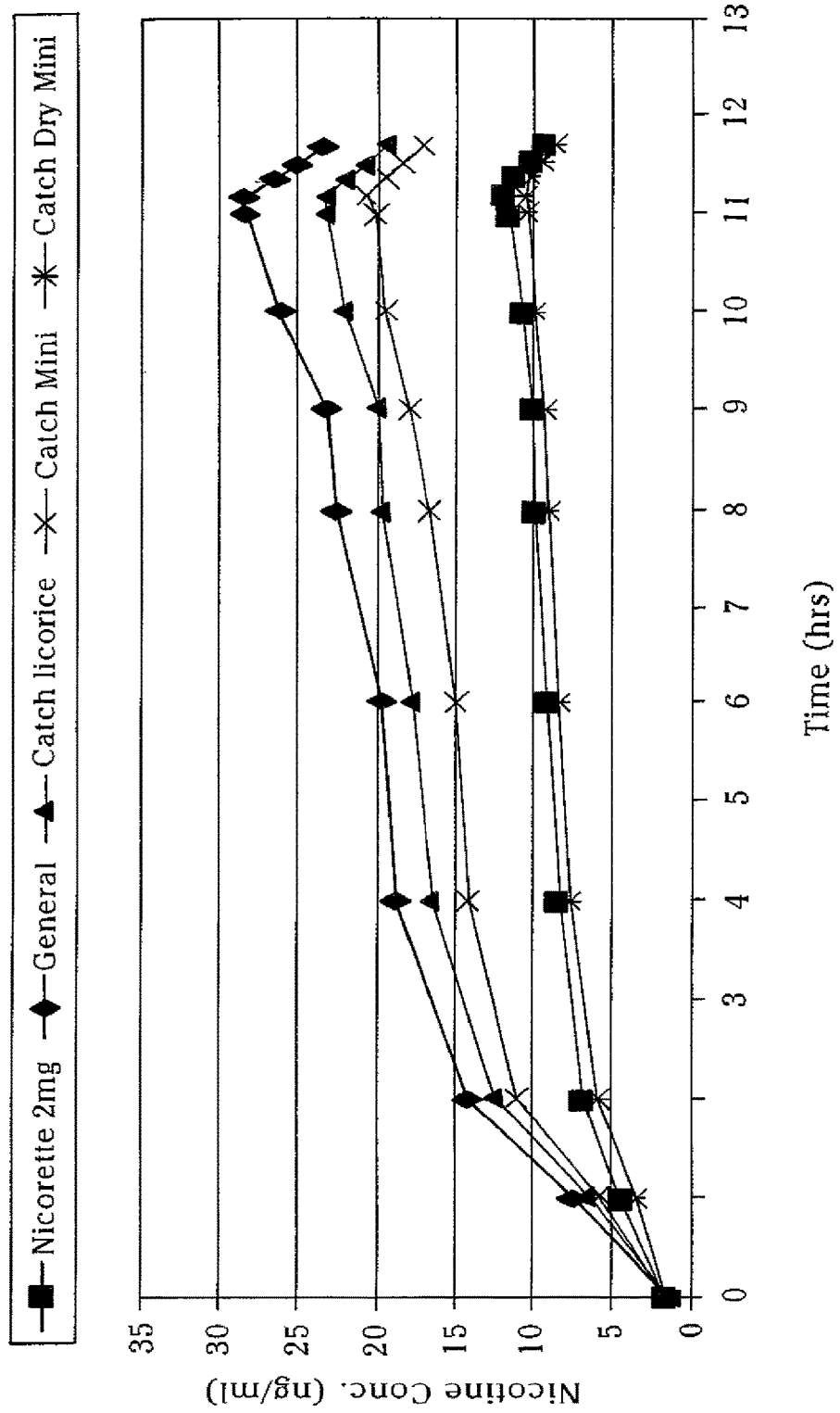
FIG. 7 is a graph showing nicotine plasma concentration vs. time curves obtained on consumption of four different snus brands and a 2 mg nicotine chewing gum according to the Gothiatek cited Lunell study

In the Gothiatek cited Lunell study, patients take—once each hour for twelve hours—one of four different strengths of Swedish SNUS, and at a different interval, a 2 mg nicotine gum. The resulting nicotine plasma concentration curve is shown in FIG. 7.

The Lunell study demonstrates that nicotine absorption from the 2 mg gum virtually mirrors the nicotine absorption from a "Catch Dry Mini." Catch Dry Mini is SNUS pouch containing 300 mg of tobacco (See Lunell). Nicotine plasma levels were nearly doubled over the 2 mg gum by the Catch Licorice that contains 800 mg of tobacco.

Figure 8:
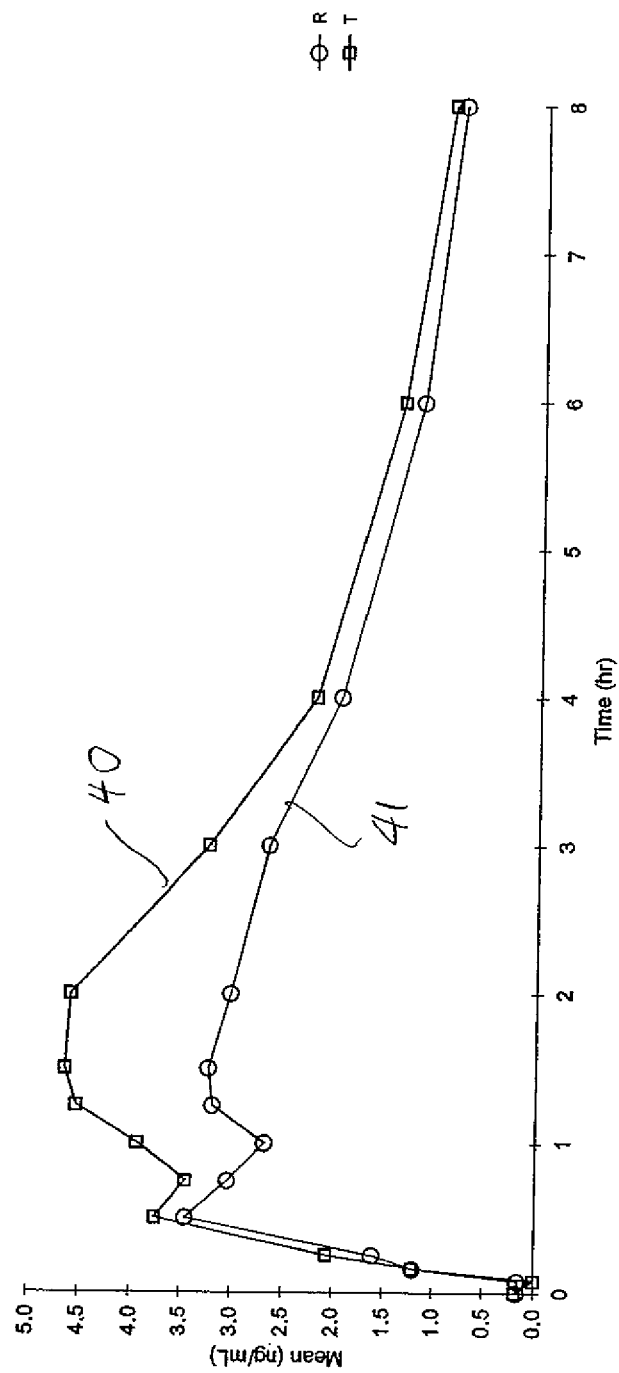
FIG. 8 is nicotine plasma concentration time curve vs. time comparing a tobacco sheet according to the present invention against a 2 mg gum, according to Example O.

To test the present invention, a single dose study (as distinguished from the Lunell study which dosed patients each hour with an additional dose) was performed on six patients to compare the nicotine absorption from a tobacco sheet containing 75 mg of tobacco with a 2 mg gum. The nicotine plasma concentration time curve is shown in FIG. 8.

More particularly, an open label, randomized, two-treatment, two-period, two-sequence, single dose, crossover comparative bioavailability study was conducted of nicotine of a tobacco product sheet of the present invention compared with that of Nulife Chewettes (containing Nicotine Polacrilex USP equivalent to Nicotine 2 mg) of Ceejay Healthcare Private Ltd., India (In technical collaboration with Positive Healthcare LLC, New York, USA) with at least seven days washout period between each administration in six healthy, adult, human male subjects under fed conditions.

Investigational Product(s):

Test: Single oral dose of tobacco buccal sheet of the present Invention (hereinafter designated "FT-TBF") 75 mg.

Reference: Single oral dose of Nulife Chewettes (containing Nicotine Polacrilex USP equivalent to Nicotine 2 mg) Manufactured by Ceejay Healthcare Private Ltd., India (In technical collaboration with Positive Healthcare LLC, New York, USA).

This study was conducted in compliance with ICH—Guidelines for Good Clinical Practices, Indian Good Clinical Practices Guidelines (2005), ICMR—Ethical Guidelines for Biomedical Research on Human Participants (2006) and the principles enunciated in the Declaration of Helsinki (WMA General Assembly, Tokyo 2004).

The objectives of the study were (1) to investigate the comparative bioavailability of nicotine in the two products in healthy, adult, human male subjects under fed conditions, and (2) to monitor clinical status, adverse events, assess relative safety and tolerance of FT-TBF and Nulife Chewettes. Healthy, adult, male volunteers were selected from the panel of volunteers and were screened for inclusion in the study including demography, medical, personal & family history, and general examination. Furthermore, laboratory investigations such as X ray chest, ECG, hematological, biochemical, serological & urinary analysis were performed as part of screening procedures. Pre-Check in assessment was performed on the selected healthy volunteers. Alcohol breath analysis and drugs of abuse tests were conducted in all the selected subjects. All subjects were healthy as determined by medical/medication history, physical examination, laboratory investigations, ECG and X-Ray and who fulfilled the inclusion and exclusion criteria for the study.

A standard food was provided to all the subjects 2 hours before the dosing time. Subjects were prohibited from smoking/alcohol/carbonated drinks/grapefruit or grapefruit containing products/xanthine containing products throughout the duration of the study. Subjects were not allowed to eat or drink for 15 minutes before and after dosing. A single dose of 75 mg of FT-TBF or 2 mg of Nulife Chewettes was administered to the subjects at 9.30 AM on May 4, 2008 in period I and Dec. 4, 2008 in period II. The subjects who received the test product in one study period have received the reference product in the other period as per the randomization schedule. There was a washout period of seven days between the two periods. In each period, a total of 14 blood samples (1×5 ml each) were collected at 00.00 hour (pre-dose), 00.08, 00.16, 00.25, 00.50, 00.75, 01.00, 01.25, 01.50, 02.00, 03.00, 04.00, 06.00 and 08.00 hours post-dose. The total volume of blood withdrawn per subject in this study was about 166 ml. After collection, blood samples were centrifuged at 3000 rpm for 10 minutes at 4° C. to separate the plasma. All plasma samples were aliquoted into duplicates (2 sets) and stored at −20° C. The first 1 ml of the plasma samples were collected in the first aliquot and the remaining quantity of the plasma sample were collected in the second aliquot. All the subjects were monitored for any adverse event.

The analytes Nicotine, Cotinine and internal standard Metoprolol were extracted from 0.250 mL aliquot of human EDTA plasma by solid phase extraction method using Phenomenex Strata-X 33Jm, 30 mg/1 mL SPE cartridges. The samples were injected into a liquid chromatography coupled with mass spectroscopy (LC-MS/MS) using Phenomenex Luna HILIC 200A, 100×2 mm, 5J column. The mobile phase consisted of mixture of 10 mM Ammonium formate buffer (pH 3.5): Acetonitrile (10:90). Quantitation was by peak area ratio method. A weighted (1/×2) linear regression was performed to determine the concentration of analytes.

A single oral dose of tobacco buccal sheet of the present invention (FT-TBF) or Nulife chewettes was administered in each period. The treatment phases were separated by a washout period of seven days between each drug administration.

All the subjects were allocated to two treatments. Following administration of FT-TBF, all the subjects retained the film until it is dissolved completely. It took 19-34 minutes for the film to dissolve completely. Upon conclusion of the clinical phase of the study, vital signs measurements and post-study laboratory tests confirmed the absence of significant changes in the subject's state of health. Both formulations were well tolerated and there were no relevant differences in safety profiles observed between the preparations.

The sample analysis was carried out using mass spectroscopy (LC-MS/MS). Throughout the study the subjects had normal vitals and no allergic reactions were reported.

Upon analysis of data, it was observed that the Test Product (FT-TBF) shows better bioavailability profile than the Reference Product (R) Nulife Chewettes (containing Nicotine Polacrilex USP equivalent to Nicotine 2 mg) of Ceejay Healthcare Private Ltd., India. The PK parameters of Nicotine for Test and Reference for $C_{max}$, $AUC_t$ and $AUC_{inf}$ are 5.66, 19.54, 27.30 and 3.89, 15.30, 22.87, respectively. The PK parameters of Cotinine for Test and Reference for $C_{max}$, $AUC_t$ and $AUC_{inf}$ are 19.34, 112.41, 886.01 and 15.37, 87.01, 233.17 respectively. The Vz (Volume of Distribution) of Test and Reference for Nicotine and Cotinine are 14/260, 188.25, 488454.45 and 4319888.30, 127879.28 respectively and even the clearance (Cl) also depicts a better profile of Test and Reference for Nicotine and Cotinine such as 3378838.03, 110488.18 and 153492.40, 9106.64 respectively.

In the foregoing:

$C_{max}$=Maximum measured plasma concentration over the time span specified.

$AUC_t$=the area under the plasma concentration versus time curve, from time 0 to the last measurable concentration, as calculated by the linear trapezoidal method.

$AUC_{inf}$=the area under the plasma concentration versus time curve from time 0 to infinity. AUC0-∞ is calculated as the sum of AUC0-t plus the ratio of the last measurable plasma concentration to the elimination rate constant.

$AUC_{Extrap}$=the extrapolated area under the plasma concentration versus time VZ Volume of distribution based on the terminal phase Cl=Total body clearance and is calculated as CL=Dose/AUC MRTlast=Mean Residence Time when the drug concentration profile is not extrapolated to infinity, but rather is based on values up to and including the last measured concentration: MRTlast=AUMClast/AUClast MRTINF=Mean Residence Time when the drug concentration profile is extrapolated to infinity AUMClast=Area under the moment curve computed to the last observation.

TBF=Tobacco Buccal Film (sheet)

CRF=Case Report Form

AE=Adverse Event

ANOVA=Analysis of Variance

The mean of the concentration of nicotine in all of the subjects' blood is plotted vs. time in FIG. 8 for the sample of the present invention (curve 40) and the reference sample (curve 41).

The 75 mg tobacco sheet of the present invention had a mean $C_{max}$ (maximum plasma concentration) of 5.66 as compared with a mean $C_{max}$ for the 2 mg gum of 3.89-exceeding the reference gum by 30%. The 75 mg tobacco sheet had a mean $AUC_{inf}$ (area under the plasma concentration versus time curve from zero to infinity) of 27.30 as compared with a mean $AUC_{inf}$ for the 2 mg gum of 22.87-exceeding the reference gum by 16%.

The implication of this study is the dramatic enhancement of the nicotine bioavailability of tobacco contained in the presently invented sheet. A 75 mg sheet delivered substantially more nicotine than a 2 mg nicotine gum, whereas the Lunell study indicates that a 300 mg SNUS pouch merely mimics a 2 mg nicotine gum for nicotine delivery.

EXAMPLE P

Ten pieces of Nicorette, 1.2 gm each were soaked in water to soak off the chickle coating; after soaking off the chickle coating, each piece was now 1 gm each, thus all ten totaled 10 gm. This 10 gm was added to 30 gm of the starting composition of Example A, thoroughly mixed and heated to form a sheet between two pieces of cold foil. As a control example, 10 gm of the starting composition of Example A was made into a sheet. 500 mg pieces were then cut of both. The control example A was sucked for 5 minutes and weight was down to 155 mg. At 7 minutes, a control trace was present. Then a suck test was done on 500 mg Nicorette (25% or 125 mg. is gum base) and at 5 minutes it weighed 277 mg., at 7 minutes 261 mg., and at 10 minutes 237 mg. It was therefore concluded that the insoluble polymer used in Nicorette, polacrilex, will lengthen the dissolution time because it is not water soluble.

The test was repeated with 500 mg of the control example to obtain the following results:

| | |
|---|---|
| 2 minutes suck test: | 462 mg. |
| 4 minutes: | 301 mg. |
| 5 minutes: | 119 mg. |
| 7 minutes: | trace. |

The test was repeated with 500 mg of this Example P with insoluble polymer (polacrilex) and (125 mg. gum base):

| | |
|---|---|
| 2 minutes: | 470 mg. |
| 4 minutes: | 370 mg. |
| 5 minutes: | 310 mg. |
| 7 minutes: | 275 mg. |
| 10 minutes: | 230 mg. |

It is concluded that the insoluble polymer will lengthen the time for dissolution. It will also convey particulate unwanted taste. (Polacrilex is a highly purified crosslinked polyacrylic copolymer supplied in Hydrogen form. This polymer has the following technical characteristics:

| | |
|---|---|
| Type of Resin: | Weak acid cation exchange resin |
| Matrix structure: | Crosslinked polyacrylic copolymer |
| Functional group: | Carboxylic |
| Physical form: | White to off-white fine free flowing powder |
| Ionic form: | Hydrogen |
| Particle size (US mesh): | +100 - 0% |
| | +200 - 15% max. |
| | −200 - 85% min. |
| Total Exchange Capacity: | 10.0 meq/dry gram (min) |
| Solubility: | Insoluble in all common solvents.) |

EXAMPLE Q

Five pounds of the starting composition of Example A were mixed in the same method as example A. The same process conditions were used to extrude a sheet, except the die was full opened and the take off rollers were slowed down. This had the effect of increasing the thickness of the sheet to 25 mils. It was observed that the composition could be made still thicker by an increase in the rpm of the screw from 180 rpm. One inch square pieces were cut and took approximately 45 minutes to dissolve. The roll was found to be flexible when made and after 60 days exposure to ambient conditions.

EXAMPLE R

One pound of the starting composition of Example A was mixed by the same method as Example A. The mix was pressed between two pieces of aluminum foil. The foil sandwiched material was sandwiched between a hot plate at 325 Fahrenheit and a hot iron, which was pressed down on the sandwich. The heat and pressure melted the composition into a sheet. The resulting sheet was uneven in thickness, with an average thickness of 30 mils and was flexible.

EXAMPLE S

Five samples of the extruded composition of Example A of a piece weight of 210 mg's were sent to a validated, third part lab for TSNA testing. The results indicated a total average TSNA content of 3.56 ppm. This was compared with the publicly available data on TSNA levels in Bruton's snuff from Brad Rodu's "Smokeless Tobacco and Oral Care: A review of the Risks and Determinants," Crit Rev Oral Biol Med 15(5) 252-263 (2004) and it was concluded that the manufacturing process did not result in any increase of TSNA levels for tobacco contained in the product.

While this description describes some embodiments of the invention, the invention is not limited thereto. One skilled in the art will understand that numerous variations and modifications are possible without departing from the spirit and scope of the invention defined by the following claims.

What is claimed is:

1. A smokeless tobacco product comprising a sheet made by extruding or hot melt shaping a nonaqueous composition comprising at least one water soluble thermoplastic polymer and tobacco, wherein the tobacco is present in an amount of less than 100 mg in a single dose of the product such that a user's maximum measured nicotine plasma concentration is greater than 4 ng/ml, the sheet comprising a matrix comprising the at least one thermoplastic polymer and the tobacco distributed in the matrix, the matrix being soluble in a user's mouth and resulting in sustained release of nicotine to the user.

2. The smokeless tobacco product according to claim 1, wherein the smokeless tobacco product has a pH of 6 to 8 when the composition is present in the user's mouth.

3. The smokeless tobacco product according to claim 1, wherein the nonaqueous composition further comprises a buffering agent for controlling a pH of the sheet to be 6 to 8 when the extruded sheet is present in a user's mouth.

4. The smokeless tobacco product according to claim 1, wherein the sheet has an average dissolution time of 5 to 50 minutes, measured for a sheet having a surface area of approximately 1-1.5 in2 and a thickness of approximately 10-50 mil, to dissolve fully in a buccal cavity of a user.

5. The smokeless tobacco product according to claim 1, wherein the sheet has a thickness that varies over its entire surface area as compared to an average thickness of the extruded sheet by at most ±10%.

6. The smokeless tobacco product according to claim 5, wherein the sheet has a tobacco content that varies over its entire surface area by at most ±10%.

7. The smokeless tobacco product according to claim 1, wherein the sheet has a tobacco content that varies over its entire surface area by at most ±10%.

8. The smokeless tobacco product according to claim 1, wherein the at least one water soluble thermoplastic polymer is contained in an amount of at least 20 wt % of the whole composition.

9. The smokeless tobacco product according to claim 1, wherein the sheet has a thickness of 5 to 50 mils.

10. The smokeless tobacco product according to claim 1, wherein the sheet has a rectangular shape having a length of ¹⁄₁₆ inch to 4 inches long, a width of ¹⁄₁₆ inch to 4 inches and a thickness of 5 to 50 mils.

\* \* \* \* \*